(12) United States Patent
Lutzka et al.

(10) Patent No.: US 7,500,707 B2
(45) Date of Patent: Mar. 10, 2009

(54) REMOVABLE VEHICLE SEAT

(75) Inventors: Tavis Lutzka, Davisberg, MI (US); David Grable, Clinton Township, MI (US)

(73) Assignee: BAE Industries, Inc., Centerline, MI (US)

(*) Notice: Subject to any disclaimer, the term of this patent is extended or adjusted under 35 U.S.C. 154(b) by 125 days.

(21) Appl. No.: 11/695,991

(22) Filed: Apr. 3, 2007

(65) Prior Publication Data
US 2007/0182231 A1    Aug. 9, 2007

Related U.S. Application Data

(63) Continuation-in-part of application No. 11/247,638, filed on Oct. 11, 2005, now Pat. No. 7,434,862.

(51) Int. Cl.
*B60N 2/04* (2006.01)

(52) U.S. Cl. .................. 296/65.03; 297/336; 248/503.1

(58) Field of Classification Search .............. 296/65.03, 296/65.05, 65.09, 65.08; 297/331, 332, 333, 297/335, 336; 248/503.1
See application file for complete search history.

(56) References Cited

U.S. PATENT DOCUMENTS

| | | | |
|---|---|---|---|
| 3,889,464 A | 6/1975 | Gardner | |
| 4,629,252 A | 12/1986 | Myers et al. | |
| 4,759,580 A | 7/1988 | Berklich, Jr. et al. | |
| 5,372,398 A | 12/1994 | Aneiros et al. | |
| 5,547,242 A | 8/1996 | Dukatz et al. | |
| 5,941,591 A * | 8/1999 | Tsuge et al. | 296/65.09 |
| 6,039,401 A | 3/2000 | Rus | |
| 6,053,555 A | 4/2000 | Neale | |
| 6,056,346 A | 5/2000 | Smuk | |
| 6,065,804 A * | 5/2000 | Tanaka et al. | 297/336 |
| 6,161,890 A | 12/2000 | Pesta et al. | |
| 6,164,712 A | 12/2000 | Ajisaka et al. | |
| 6,196,611 B1 | 3/2001 | Lee | |
| 6,213,525 B1 | 4/2001 | Nicola | |
| 6,361,098 B1 | 3/2002 | Pesta et al. | |
| 6,749,264 B2 | 6/2004 | Jeong et al. | |
| 6,820,912 B1 | 11/2004 | Lavoie | |
| 6,910,739 B2 | 6/2005 | Grable et al. | |
| 7,198,316 B2 | 4/2007 | Lutzka et al. | |
| 7,222,907 B2 | 5/2007 | Lutzka et al. | |
| 2003/0102705 A1 * | 6/2003 | Pejathaya et al. | 297/378.12 |
| 2005/0099047 A1 | 5/2005 | Elterman et al. | |

* cited by examiner

*Primary Examiner*—H Gutman
*Assistant Examiner*—Melissa A Black
(74) *Attorney, Agent, or Firm*—Gifford, Krass, Sprinkle, Anderson & Citkowski, PC

(57) ABSTRACT

A seat assembly incorporating a combination of seat latches including seatback, front floor and rear floor latch subassemblies. A release handle actuates the seatback latch to facilitate seatback dump against a seat bottom. Pluralities of cables are associated with the seatback latch subassembly, as well as a separate seat release module secured to an accessible location of the seat operate and, in cooperation with the front and rear latch assemblies, operate according to first and second operational protocols to accomplish forward seat tumble or, alternatively, rearward seat removal from the vehicle within which the seat is mounted.

27 Claims, 24 Drawing Sheets

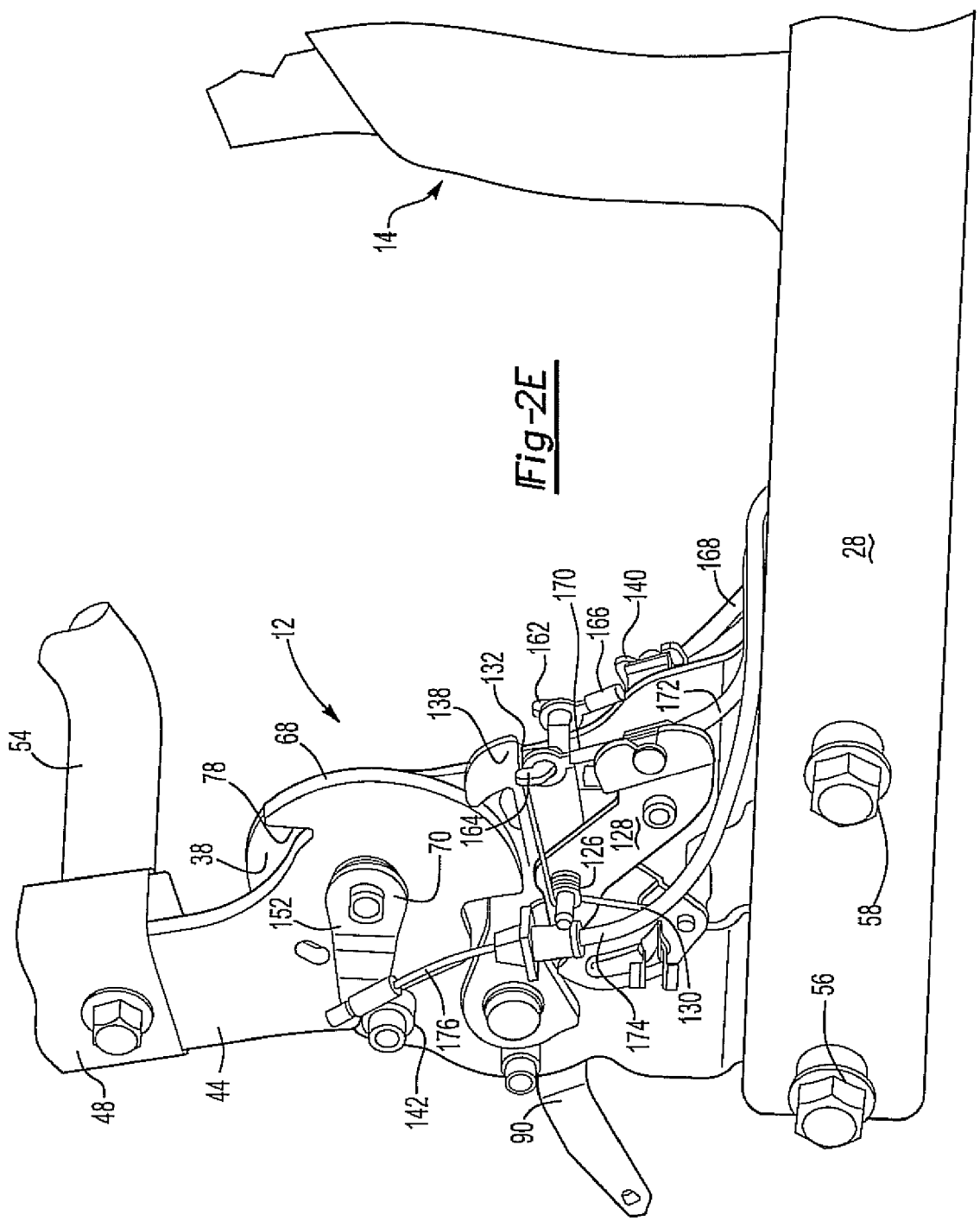

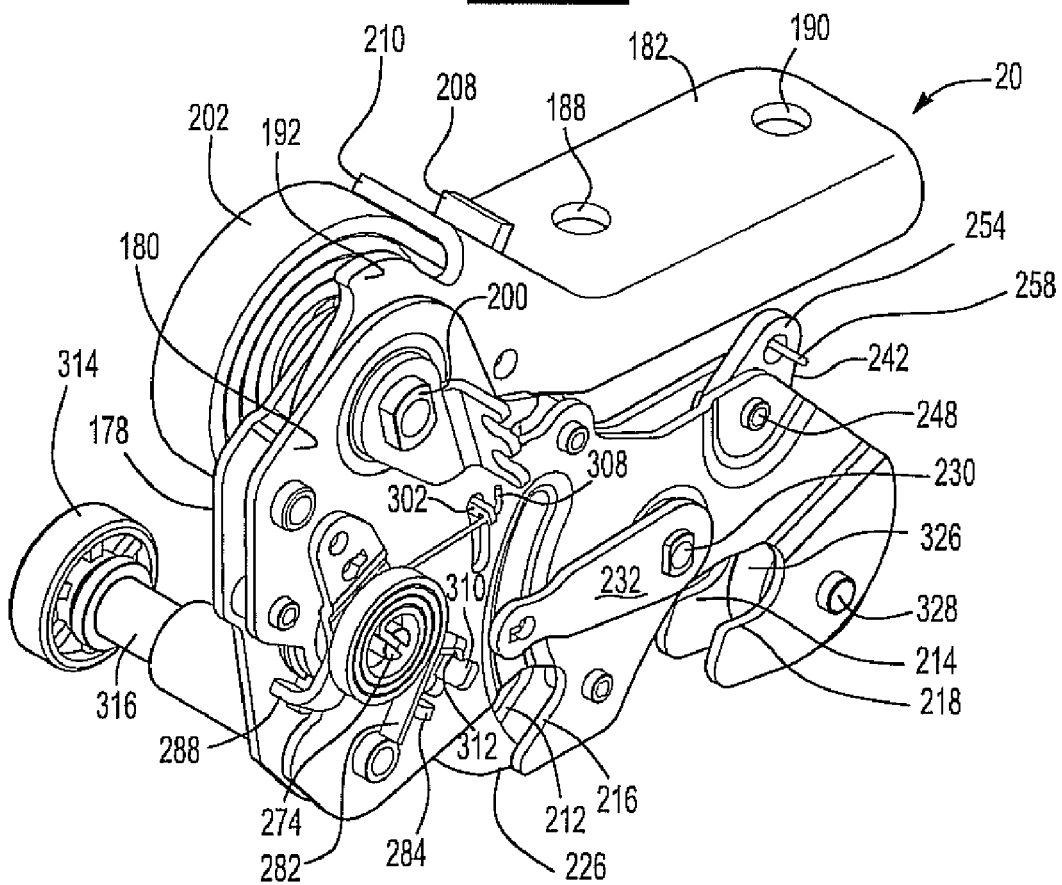
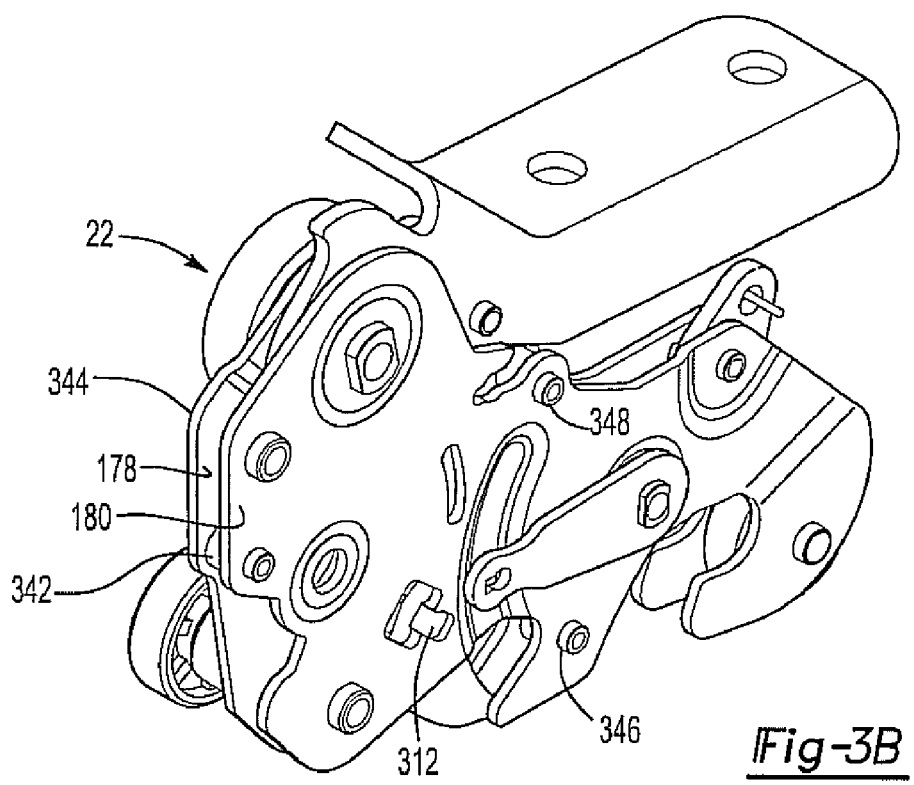

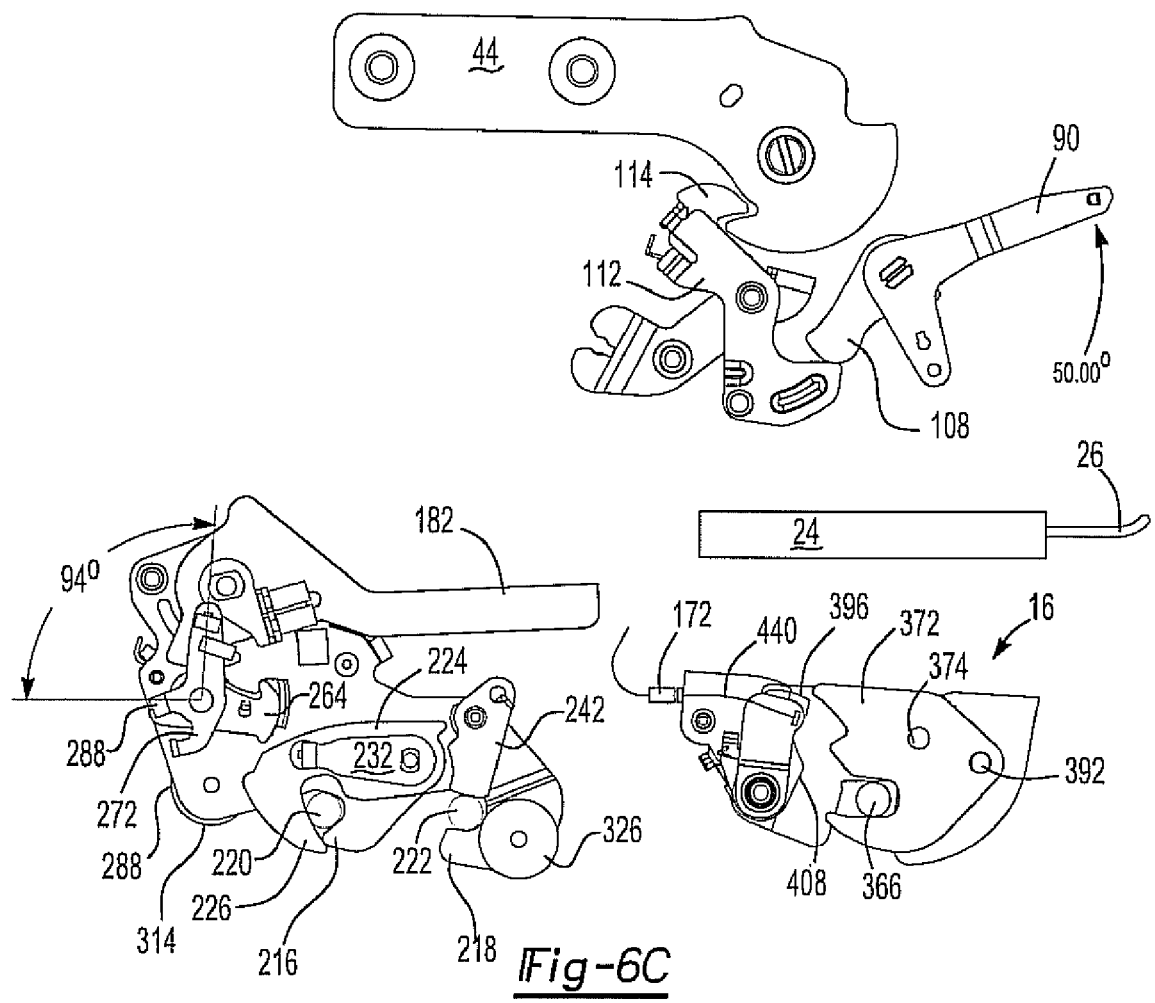

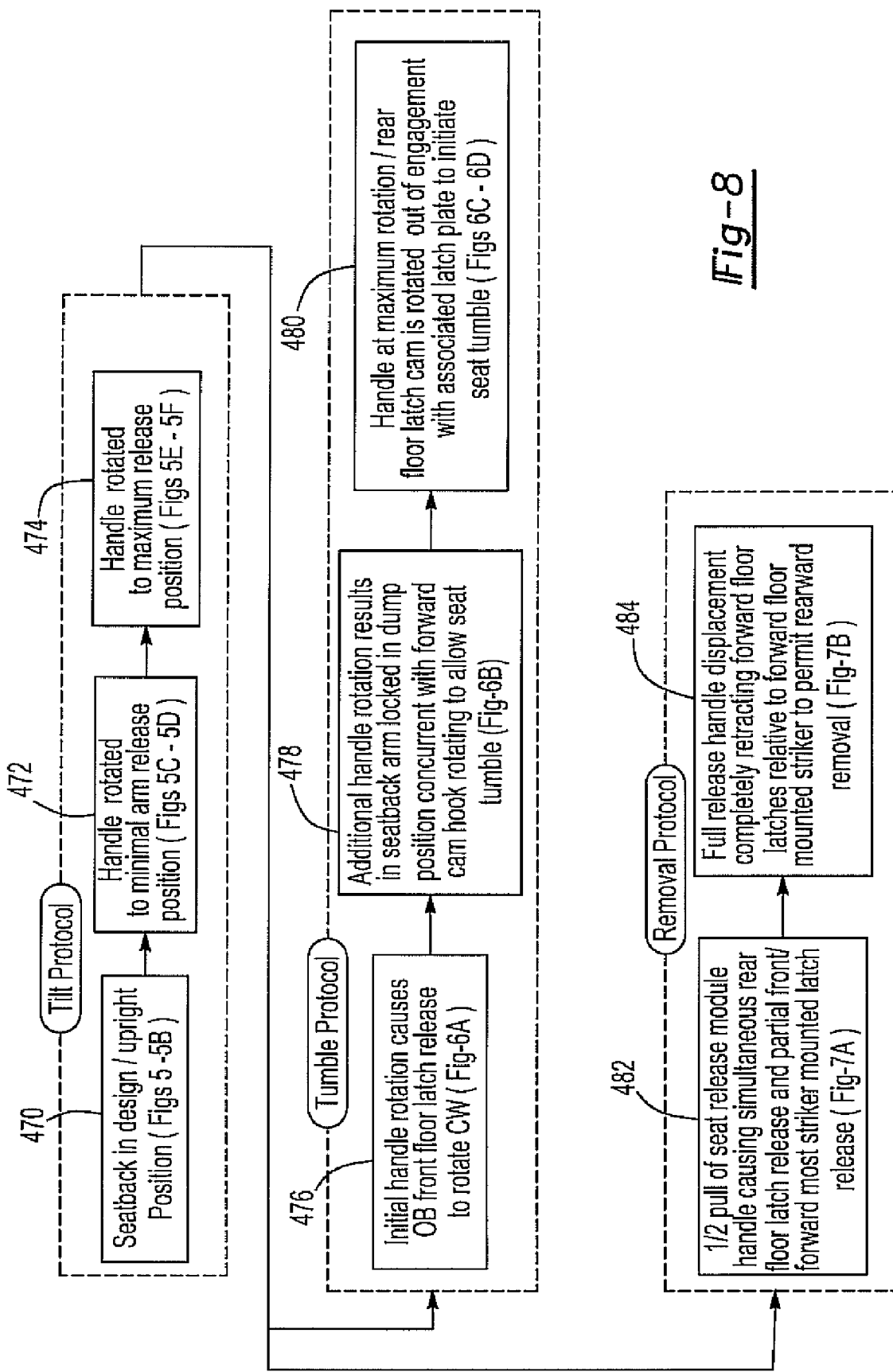

REMOVABLE VEHICLE SEAT

CROSS REFERENCE TO RELATED APPLICATIONS

The present application claims the priority of U.S. patent application Ser. No. 11/247,638, filed Oct. 11, 2005 and entitled Combination Front and Rear Floor Latch Assembly for Selective Forward Tumbling and Removal of a Rear Row Vehicle Seat.

BACKGROUND OF THE INVENTION

1. Field of the Invention

The present invention relates generally to floor latch assemblies associated with seat dump, tumble or removal. More specifically, the present invention teaches a seat assembly incorporating a combination of seat latches including a seatback latch for facilitating seatback dump, and operating in cooperation with front and rear latch assemblies for accomplishing forward seat tumble. A separate user engageable module is employed following seatback dump and, in further cooperative engagement with said front and rear floor mounted latches, facilitates rearward removal of the seat according to a separate operating protocol.

2. Description of the Prior Art

The prior art is well documented with examples of floor latch and dump assemblies associated with a vehicle seat. Many of these seat designs are concerned with the ability to fold and/or remove such as a rear row vehicle seat.

Rus, U.S. Pat. No. 6,039,401, teaches a latch mechanism which removably attaches a front portion of a collapsible and removable utility seat assembly to a latch rod on a vehicle floor pan. The latch mechanism includes a bracket adapted for attachment to the front portion of the utility seat assembly with a wheel attached thereto. The latch mechanism includes a locking mechanism connected to the bracket. The locking mechanism includes a lock member rotatably connected to the bracket and adapted for engagement with the floor pan for causing rotation of the lock member with respect to the bracket to facilitate locking of the locking mechanism onto the latch rod as the utility seat assembly is collapsed.

Jeong, U.S. Pat. No. 6,749,264, teaches a detachable seat for a vehicle including a seat bracket at the bottom thereof, and which is detachably coupled with guide grooves and front and rear strikers formed in a floor panel of the vehicle. The bracket comprises a body unit including a bracket body with front engaging grooves and rear engaging grooves for floor mounted strikers. Locking units are provided for releasing the rear striker from the rear engaging grooves in response to control of a release lever; and rollers are located to facilitate mounting and demounting of the seat.

Nicola, U.S. Pat. No. 6,213,525, teaches a lever action floor latch actuation mechanism for removably securing a seat to a pair of front and rear strikers on the floor of a vehicle. Front and rear latches are pivotally connected to the forward and rearward legs, respectively, for releasably securing the seat to the strikers. Of note, a longitudinally extending linkage pivotally interconnects the front and rear latches and an actuation member coupled to the link simultaneously moves the latches between a latched position engaging the strikers and an unlatched position disengaging the strikers.

Finally, U.S. Pat. No. 6,053,555, issued to Neale, teaches an automotive seat removable from a vehicle. Of note, a first latch assembly selectively secures the upper portion of the seat back frame to an upper interior region of the vehicle. A second latch assembly selectively secures the seat cushion to the vehicle when the seat cushion assembly is pivoted to the occupant seating condition. A retaining member is mounted on opposite interior side walls of the vehicle and is positioned to receive each of a pair of anchor pins located at ends of a crosswise extending structural member associated with the seat back frame, and upon the seat back assembly being pivoted about rollers associated with a lower portion of the seat back frame. Upon the anchor pins being fully registered within the retaining member, the first and second latch assemblies are aligned for respective interengagement and the structural member operably engages the vehicle for transferring the seat belt forces thereto.

SUMMARY OF THE PRESENT INVENTION

The present invention discloses a rear row and convertible vehicle seat releasably secured to front and rear floor mounted strikers arranged within the vehicle. The seat includes a frame incorporating a seat bottom and a pivotally associated seat back. A seatback latch subassembly is mounted to a pivotally associated location between the seat bottom and seat back and includes a release handle for selectively rotating the seat back to a dump position against the seat frame.

A front floor latch subassembly is mounted to a forward location of the seat frame and operatively engages one or more front mounted floor strikers. A rear floor latch subassembly is likewise mounted to a rearward location of the seat frame and operatively engages a rear disposed striker.

A first plurality of cables extend from specified locations of the setback latch subassembly and are in communication with the front and rear floor latch subassemblies such that the seatback latch subassembly, via actuation of its release handle, operatively engages the front and rear floor latch subassemblies according to a first operating protocol to forward tumble the seat bottom and dumped seat back about the front striker.

A seat removal module is secured to a rear accessible location of the seat frame and includes a rearwardly displaceable handle. A second plurality of cables extend from the module and are in communication with the seatback and front floor latch subassemblies. In cooperation with selected cables from the first designated plurality, and upon actuation of the displaceable handle, the front and rear floor latch subassemblies release from their associated strikers according to a second operating protocol, and to permit the seat to be removed from the vehicle in a rearward withdrawing direction. In a preferred embodiment, the seat incorporates pairs of outboard and inboard located seatback latch subassemblies, front floor latch subassemblies and rear floor latch subassemblies mounted to respective outboard and inboard side locations of the seat frame.

BRIEF DESCRIPTION OF THE DRAWINGS

Reference will now be made to the attached drawings, when read in combination with the following detailed description, wherein like reference numerals refer to like parts throughout the several views, and in which:

FIG. 3A is a sectional perspective view of an outboard located front floor latch subassembly also shown in FIG. 1;

FIG. 3B is a likewise sectional perspective view of an inboard located front floor latch subassembly;

FIG. 6C is a yet succeeding illustration of the handle at maximum rotation, and in which the rear floor latch cam is thus rotated out of engagement with the associated latch plate and the tumble motion of the seat initiated;

FIG. 8 is a flow diagram illustrating the seatback dump, seat tumble and seat removal protocols as collectively described throughout the several views constituting FIGS. 5, 6 and 7 and according to the present invention.

DETAILED DESCRIPTION OF THE PREFERRED EMBODIMENTS

Figure 1:
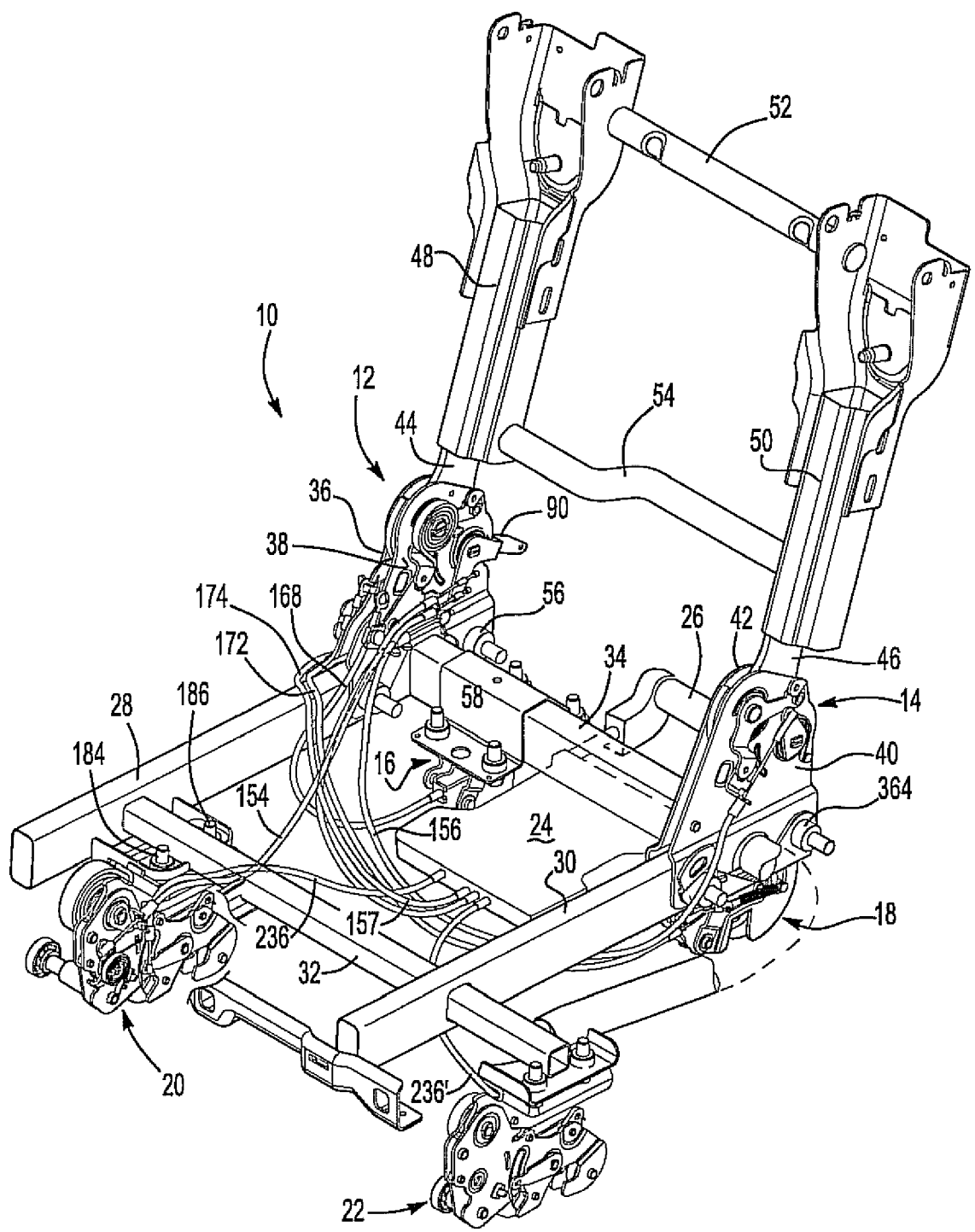
FIG. 1 is an environmental perspective of a rear row seat assembly disclosing a collection of outboard and inboard mounted seatback latch subassemblies, front floor striker mounted latch subassemblies and rear striker mounted latch subassemblies for accomplishing seat back dump and forward seat tumble protocols; additionally disclosed is the provision of a seat removal module with rearwardly displaceable pull handle, the module engaging the front and seat back mounted latch subassemblies in order to accomplish rearward seat removal.

With reference now to FIG. 1, an environmental perspective is illustrated at 10 of a rear row seat assembly according to the present invention. As previously explained, the present invention discloses a collection of outboard and inboard mounted seatback latch subassemblies, front floor striker mounted latch subassemblies and rear striker mounted latch subassemblies for accomplishing seat back dump and forward seat tumble protocols. Additionally disclosed is the provision of a seat removal module with rearwardly displaceable pull handle, the module engaging the front and rear floor mounted latch subassemblies in order to accomplish rearward seat removal.

In cooperation with the operational view of FIG. 1, additional illustrations of the construction of the seatback latch subassembly (FIGS. 2A-2C), forward floor latch subassembly (FIGS. 3A-3C) and rear latch subassembly (FIGS. 4A & 4B) are provided. Succeeding illustrations explain the operational protocols of the seat assembly 10 and include the seat back dump function (FIGS. 5A-5F), seat back tumble (FIGS. 6-6D) and seat removal (FIGS. 7-7B).

Referring again to FIG. 1, a preferred variant of the seat assembly 10 includes both outboard (i.e., located on an outer side of the seat facing a side of the vehicle) and inboard (opposite inner facing side of the vehicle compartment) located latch subassemblies of the type identified above. These include outboard 12 and inboard 14 seatback latches, outboard 16 and inboard 18 rear floor latches, and outboard 20 and inboard 22 front floor latches. Seat removal module is further referenced at 24 and includes a rearwardly displaceable pull handle 26. While the illustrated embodiment includes pairs of latch subassemblies directed to each of the seatback, floor rear and floor front latch functions, it is further envisioned that additional embodiments may operate with only a single latch associated with each of the seatback and rear/front floor functions within the scope of the invention.

As further best referenced in FIG. 1, the structure of the seat includes a bottom (typically steel) frame constructed most notably of spaced apart side members 28 and front 32 and rear 34 cross members. The front and rear latch subassemblies secure to underside locations of the seat bottom frame as referenced in FIG. 1, and with the seat 24 removal module mounting in crosswise extending fashion to the underside of the rear cross member 34.

A seat back frame is pivotally secured to the seat bottom via pairs of side disposed support plates 36 & 38 (associated with outboard seatback latch assembly 12) and further support plates 40 & 42 (associated with inboard seatback latch assembly 14). The seat back frame includes elongate extending arms 44 and 46 rotatably engaged between the respective pairs of support plates (the functionality of which will further be described in reference to FIGS. 2A, 2B and 2C), these incorporating generally extending seatback side members 48 and 50, respectively, and between which are further disposed spaced apart and crosswise extending members 52 and 54.

Figure 2A:
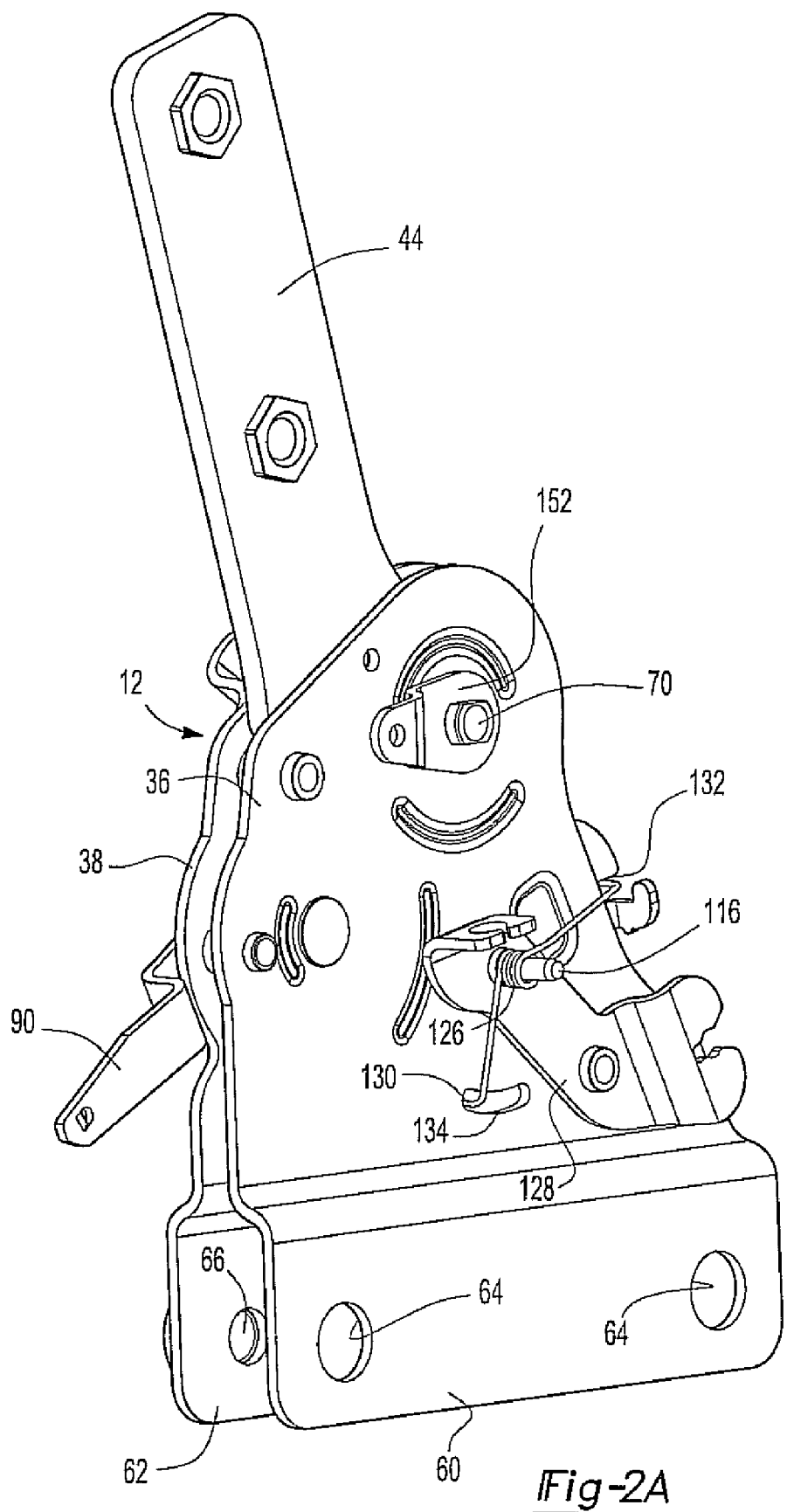
FIG. 2 is a sectional perspective view of the outboard seatback latch subassembly illustrated in FIG. 1 in substantially 180° rotated fashion.
FIG. 2B is an enlarged sectional perspective of the outboard seatback latch subassembly as substantially illustrated in FIG. 1.
FIG. 2C is an exploded view of the latch subassembly in FIG. 2.
FIG. 2D is an enlarged illustration in perspective of the cables associated with the seatback mechanism similar to that shown in FIGS. 1 and 2B, with the outboard support plate removed for clarity of illustration.
FIG. 2E is a rotated illustration in perspective of the cable arrangement of the seatback mechanism also shown in FIG. 2A.
Figure 2B:
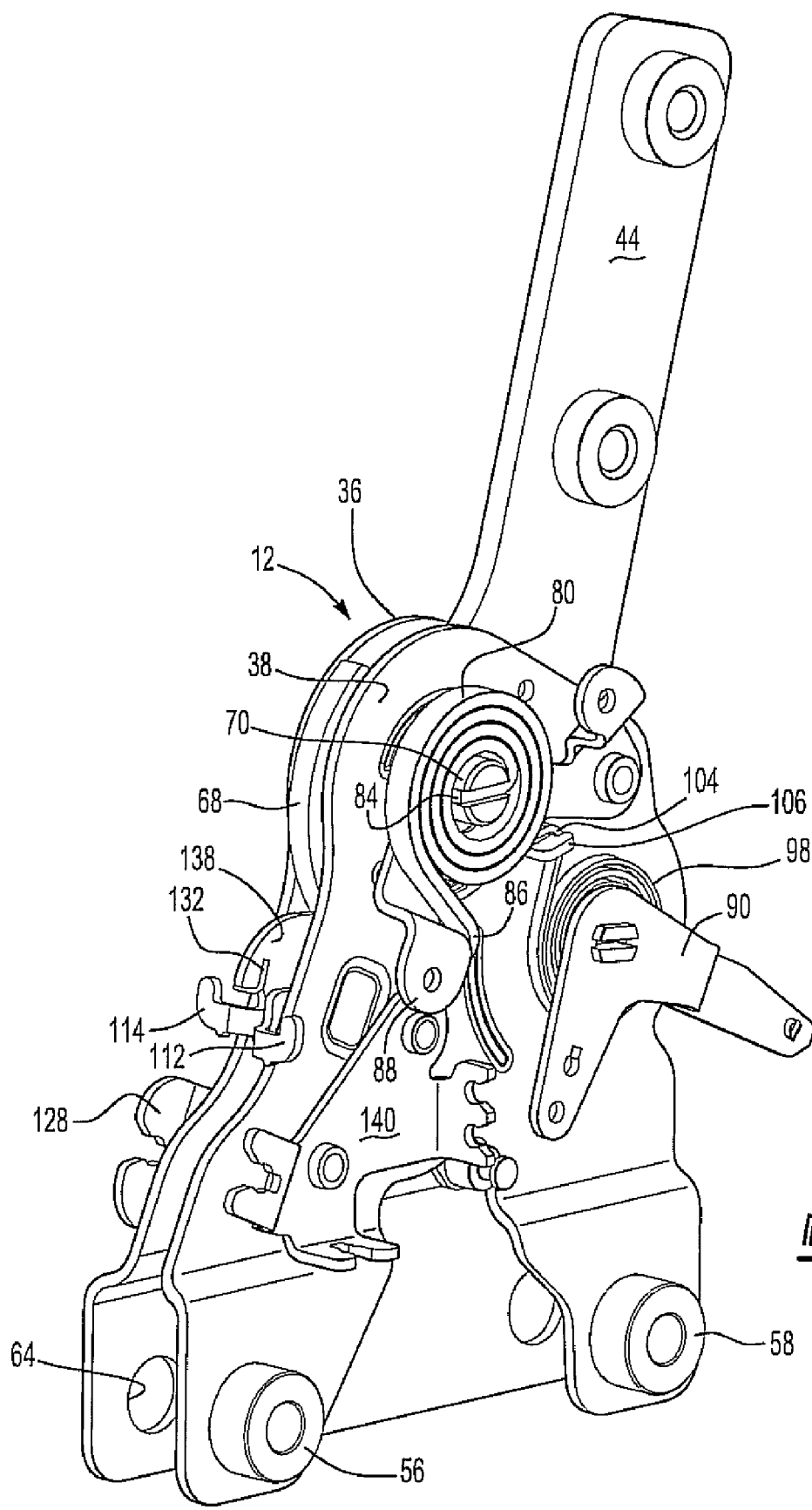
Figure 2C:
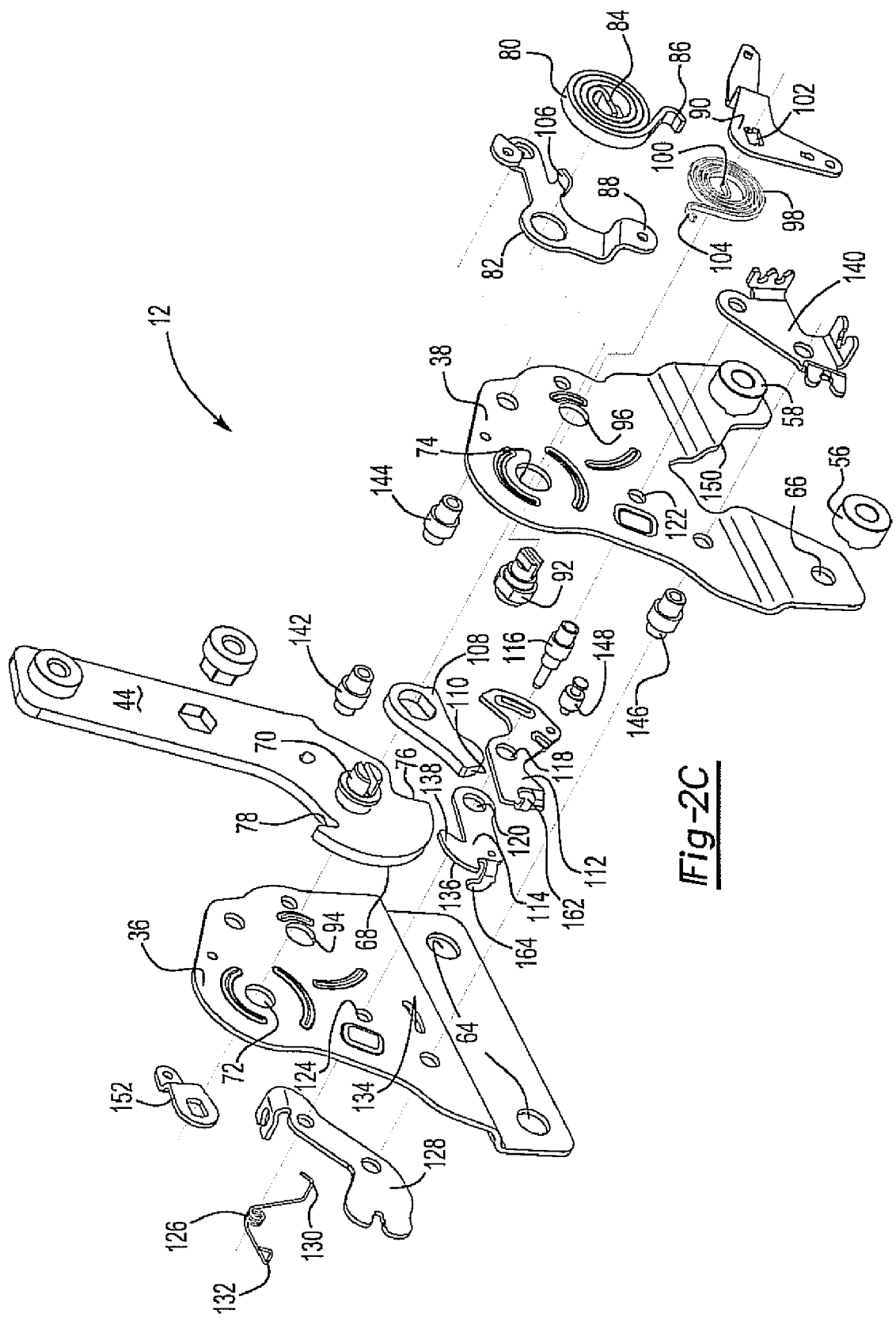

Referring now collectively to FIGS. 2A, 21 and 2C, successive first and second rotated perspective and exploded views are illustrated of the outboard seatback latch subassembly 12. The pairs of spaced apart mounting plates, see as again referenced for example by support plates 36 and 38, are secured to the respective rear end locations of the frame bottom sides 28 and 30, via mounting fasteners (see for example as further referenced at 56 and 58 in FIG. 1), these extending through pairs of apertures defined in bottom flange mounting locations 60 and 62 (see further apertures 64 and 66) associated with the support plates 36 and 38, respectively.

The elongate seatback arm 44 is generally plate-shaped in cross section and exhibits a substantially arcuate lower profile 68 at its lower end, this being rotatably slaved between plates 36 and 38 via a main pivot pin 70 extending through the seatback arm 44 and seating within mating apertures 72 and 74 defined within the plates 36 and 38. The lower arcuate profile 68 includes first 76 and second 78 shoulder locations at circumferentially spaced locations, these associated with upright/design and dump/fold configurations of the seatback arm 44.

A main clock spring 80 is provided for biasing the seatback arm 44 in a counterclockwise/dump direction and seats about a pin 70 extending through aperture 74 in the plate 38. An interlock lever 82 is provided and over which the clock spring 80 seats, an inner angled end 84 of the spring 80 seating within a notch defined in the main pivot pin 70, and a corresponding angled outer end 86 abutting an extending and stepped end 88 of the interlock lever 82.

A generally boomerang shaped release handle 90 is secured, at a generally intermediate location, to an exterior surface of the support plate 38 via a pin 92 which extends through mating apertures 94 and 96 associated with the support plates 36 and 38, these being offset from the main pivot location of the seatback arm 44 defined by support apertures 72 and 74. A secondary clock spring 98 biases the release handle 90 in a generally clockwise direction and includes an inner curled end 100 seating through a notched location of the pin 92 (extending through a slaved apertured location 102 of the release handle 90). An outer curled end 104 of the secondary spring 98 engages an intermediate projection 106 associated with the main pivot pin associated interlock lever 82.

A seatback cam 108 is disposed in sandwiching fashion between the seatback support plates 36 and 38 and is rotatably slaved with the release handle 90. The cam 108 exhibits an outer arcuate edge 110 which supports the seatback 44 in the upright design position, and by engaging the first support shoulder 76 defined in the arcuate lower profile 68 of the arm 44.

A seatback latch release lever is collectively defined to include a first (also termed outboard relese latch lever) component 112 and a second partially overlapping and hook engaging component 114. A pin 116 extends through aligning apertures 118 and 120 defined through the first 112 and second 114 components of the release latch lever (see again FIG. 2C), the pin seating within an aperture 122 associated with the outer plate 38 and through a further mating aperture 124. A central wound portion of a biasing coil spring 126 seats over a projecting end portion of the pin 116.

Cable support brackets are provided on first and second exterior locations of the support plates and include a bracket 128 secured to an exterior facing surface of the support plate 36, over which seats the spring 126. First and second ends 130 and 132 of the biasing spring 126 engage, respectively, a slotted location 134 defined in a lower intermediate location of the plate 36, and a projecting lower edge 136 of a hook portion 138 of the hook engaging component 114, thus biasing the hook portion 138 in a direction towards the seatback arm 44, and absent a contrary influence introduced by rotation of the cam 108 against slaved portion 112 of the release lever mechanism.

Another cable support bracket is generally shown at 140 and secures to an exterior surface of the support plate 38. Additional features include spacer rivets that secure the support plates 36 and 38 in their desired spaced apart fashion, these including a rivet 142 which abuts the seatback arm 44 in the upright/design position. Additional rivets 144 and 146 (see FIG. 2C) are also provided and which engage through respective aligning pairs of apertures in the support plates.

Also best illustrated in FIG. 2C is a further rivet portion 148, secured to a bottom intermediate location of the first release lever portion 112, and abutting against an inside configured surface 150 of the second support plate 38, this defining a maximum counter clockwise range of rotation of the lever portion 112. Additionally shown is a further rotatable and cable actuating portion 152 disposed on an exterior of support plate 36 (as shown in FIGS. 2A and 2C) and rotatably slaved with the main pivot pin 70.

Figure 2D:
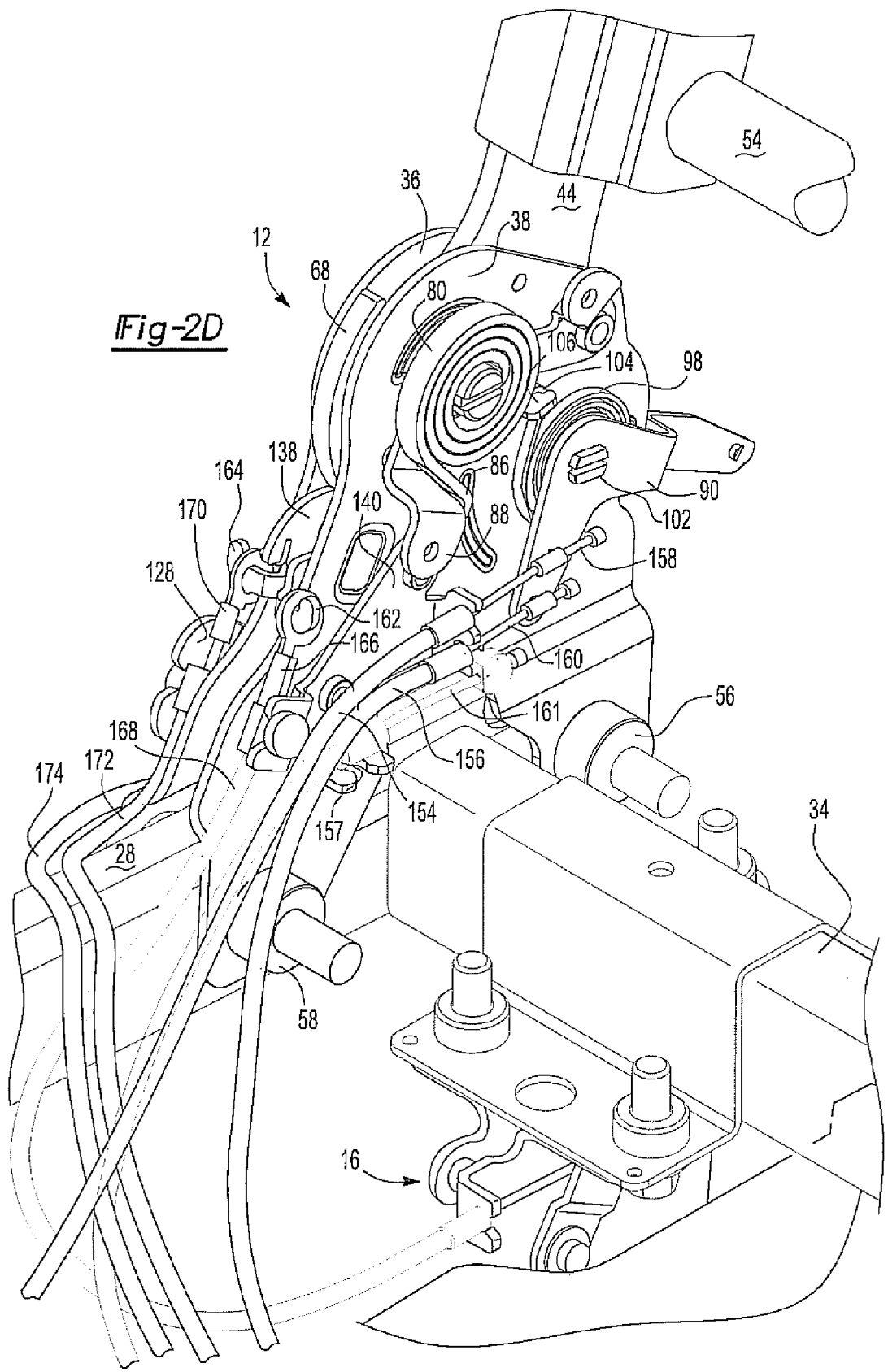

Additional to the perspective view of FIG. 1, FIGS. 2D and 2E further illustrate a first plurality of cables (6) cooperatively associated with varying locations of the seatback release mechanism 12 and which are employed with the seat dump, forward tumble and rearward removal protocols. As will be further described in additional detail, a total of four cables (including two associated with the seatback latch 12) communicate with the seat removal module 24 and, in cooperation with a cable extending from the seatback latch mechanism, communicate with locations associated with the front and rear floor latch subassemblies for rearward withdrawal of the seat, this again alternative to executing a tumble protocol and following execution of initial seatback dump.

Explanation of the operation of the various cables will be better understood with subsequent reference to the seat dump, tumble and removal protocols. That said, the cable support bracket 140 supports, at selected locations, first 154, second 156 and third 157 outer fixed cable sheaths associated with inner translating wire cables, 153, 160 and 161 respectively. The first 158 and second 160 translating cables are secured to angled end locations associated with the boomerang shaped release handle 90. As will be further described in better detail with reference to the latter operational illustrations, the first cable 154 extends to the forward seatback latch subassembly 20, whereas the second cable 156 extends to a rotatable cable actuating portion (identical to that shown at 152) associated with the second and inboard located seatback latch subassembly 14. As shown in FIG. 1, and as will be subsequently described, the third 157 cable extends to an input location associated with the seat removal module 24.

The components 112 and 114 collectively defining the seatback latch release lever each include a tab, see at 162 and 164, respectively, extending in angled and projecting fashion beyond the support plates 36 and 38. An inner translating cable 166 associated with outer sheath 168 (defining a further fourth cable) fixed to a further location of support bracket 140 is secured to tab 162 (associated with release lever component 112). This cable, generally referenced again by outer sheath 168, extends to an input location of rear floor latch subassembly 16 (to be further described).

A further inner translating cable 170 is associated with outer sheath 172 (fifth cable) fixed to a location associated with cable support bracket 128 and is secured to tab 164, associated with release lever component 114 including seatback arm engaging hook 138. The cable 172 extends to likewise input location associated with the other rear floor latch subassembly 18.

Finally cable 174 (sixth associated with seatback latch subassembly 12) is secured to a further location associated with the support bracket 128 and includes an inner translating portion 176 secured at its end to the rotating cable actuating portion 152 slaved to the main seatback arm pivot 70. This cable 174 extends to a further location of the seatback removal module (similar to cable 157) and, as will be further described, is engaged by the rearward actuation of the module handle 26 in order to assist in the seat removal protocol.

Having provided a structural description of the seatback latch mechanism(s), a description will now be made to the outboard front floor latch subassembly 20 of FIGS. 3A, 3C and 3D, as well as the inboard front floor latch subassembly 22 in FIG. 3B. With emphasis being given primarily to the construction of the forward and outboard seat latch subassembly 20 in FIGS. 3A, 3C and 3D, it is understood that both this latch 20 and the corresponding inboard latch 22 of FIG. 3B are substantially identically constructed (such that a repetitive description of all of the components within inboard latch subassembly 22 is unnecessary) and the forward latch subassemblies operate in tandem to accomplish the seat tumble and seat removal protocols.

Figure 3C:
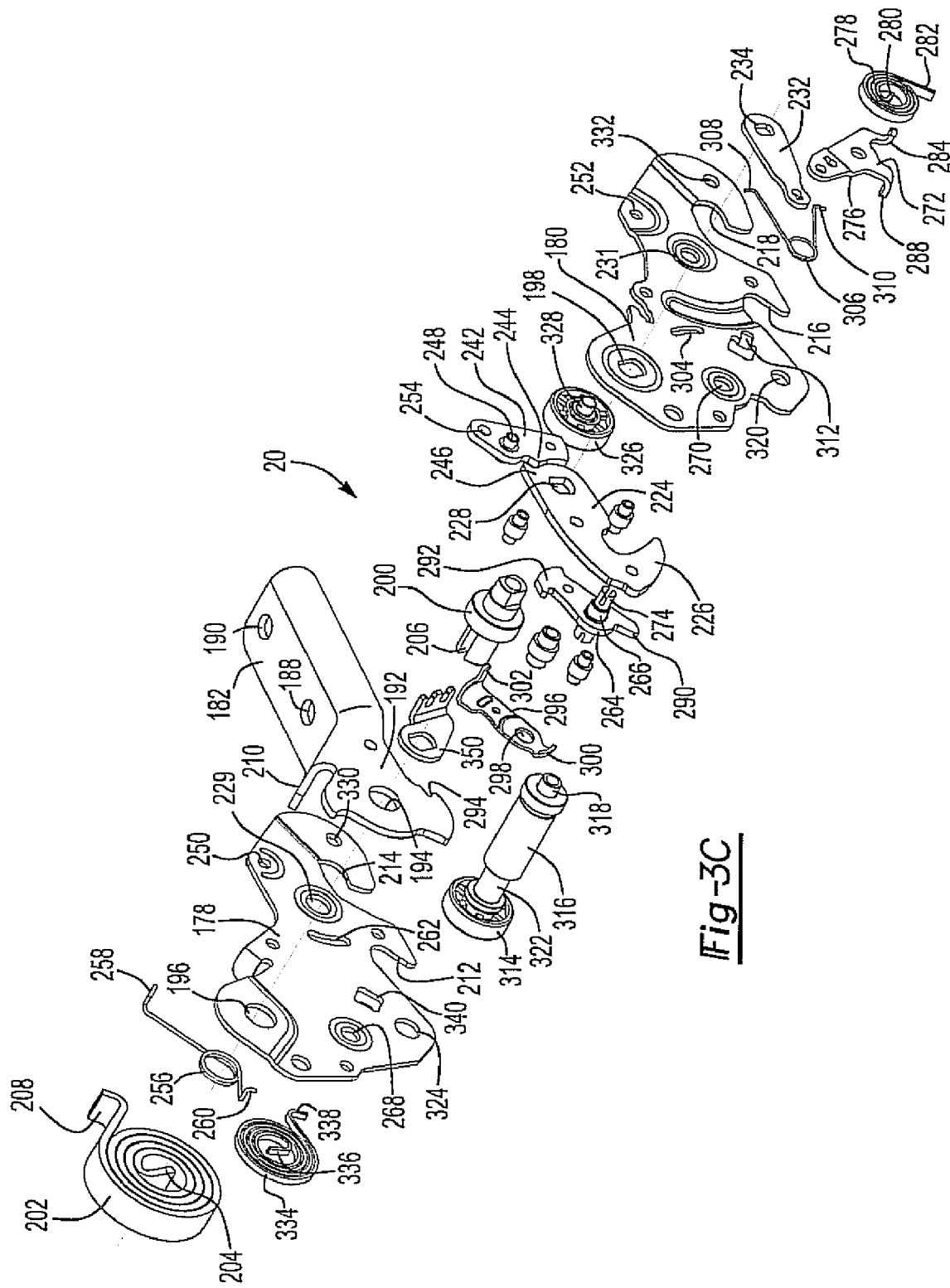
FIG. 3C is an exploded view of the outboard located front floor latch subassembly shown in FIG. 3A.

Referring first to FIGS. 3A and 3C, the latch subassembly 22 includes a pair of spaced apart support plates 178 and 180. A forward seat frame support arm defines a first bracket portion 182, a substantially planar surface whereof is arrayed in a generally perpendicular fashion relative to the parallel defined surfaces of the support plates 178 and 180. The bracket portion 182 is secured to a forward cross frame 32 location of the seat 10 (see again FIG. 1) via a pair of mounting fasteners 184 and 186 (see again FIG. 1) which extend through apertures 188 and 190 (FIGS. 2A and 2C) defined through the turned bracket portion 182.

Integrally connected to the bracket portion 182 is a turned end mounting portion 192 (see as best shown in FIG. 3C). An aperture 194 defined in the portion 192 matingly aligns with further apertures 196 and 198 (again FIG. 3C) defined in the support plates 178 and 180, such that a main pin 200 engages therethrough in order to mount the forward seat frame support arm in pivoting fashion relative to the support plates 178 and 180. A main clock spring 202 is secured to an outboard side of the support plate 178 and includes an angled inner end which seats within a notched incision 206 defined in an inserting portion of the main pivot pin 200. A corresponding outer curled end 208 of the main clock spring 202, upon assembly, engages an angled projection 210 associated with an intermediate location of the forward seat frame support arm and such that the seat support arm (e.g. again including integrally formed components 182 and 192) is biased in a counterclockwise and forwardly pivoting fashion relative to the floor support plates 178 and 180.

Returning to the floor support plates 178 and 180, each includes a lower configuration suitable for receiving first and second forward disposed and spaced apart floor mounted strikers. Reference is made in particular to lower most and forward directed projections 212 & 214 associated with plate 178 and corresponding projections 216 & 218 associated with plate 180. As illustrated in the assembled view of FIG. 3A, the mating aligning of these pairs of projecting portions (212 & 216) and (214 & 218) define receiving locations for the associated floor mounted strikers (reference further being had to strikers 220 and 222 illustrated in the plan view of FIG. 5)

A substantially plate shaped floor hook 224 is rotatably secured between the support plates 178 and 180, and defines a lower hook portion 226 which, upon assembly, opposes and is disposed between the forward most pair of projecting and spaced apart forward directed portions 212 and 216. A keyed aperture 228 (see again as best shown in FIG. 3C) is defined within a further location of the floor hook 224 and through which seats a keyed projecting end 230 of a further pivot pin (see as shown in FIG. 3A), the same seating through further pair of aligning apertures 229 and 231 within plates 178 and 180.

An engagement lever 232 is arranged on an exterior face of the support plate 180 and includes a keyed aperture 234 into which the keyed projecting pin end 230 seats in order that the intermediate disposed floor hook 224 is slaved rotatably to the lever 232. Referring to FIG. 3D, and as will be discussed subsequently in additional detail, a selected cable (see fixed outer sheath 236 and translatable inner coil 238) is secured to an extending end location 240 of the engagement lever 232. The cable 236 extends to the seat removal module 24 and, along with cables 157 (FIG. 2D) and 174 (FIG. 2E) associated with the seatback latch subassembly 12, are operably actuated by the seat removal module 24.

An anti-chucking cam 242 is provided and arranged between the support plates 178 and 180 in contacting fashion with a rear-side configured edge of the floor hook 224. Specifically, and as is best shown in FIG. 3C, a mating ridge and valley configuration is established between opposing edges of the cam 242 (at 244), and the floor hook 224 (at 246). The cam 242 is rotatably secured between the support plates 178 and 180 via a generally centrally disposed pin 248 extending therethrough and which seats within further, upper and rear disposed, mounting locations 250 and 252 associated with plates 178 and I 80.

An upper portion of the cam 242 projects from the support plates (see assembled view of FIG. 3A) and includes an aperture 254 defined therethrough. A coil spring 256 (again FIG. 3C) secures in generally aligning fashion with apertures 229 and 231 (through which pin 230 shown in FIG. 3A inserts). A first angled end 258 of the coil spring 256 engages the anti-chucking cam 242 via the aperture 254. A second opposite angled end 260 of the spring 256 (again FIG. 3C) engages the inwardly defined walls of a slot 262 (see plate 178 in FIG. 3C) such that the first angled spring end 258 biases the anti-chuck cam 242 in a counterclockwise direction.

A cam hook and lockout assembly is provided with the function of selectively releasing the forward seat back and for tumbling/pivoting motion relative to the floor striker supported floor plates. Specifically a cam hook 264 (again as best shown in FIG. 3C) is arranged between the support plates 178 and 180 and includes a centrally disposed and crosswise extending pin 266 which seats through plate apertures 268 and 270.

A secondary engagement lever is referenced at 272 (again FIG. 3C) and secures to an outer face of the support bracket 180. A notched end 274 of the pin 266 extends through the aperture 270 in the support plate 180 and through a likewise centrally disposed aperture 276 in the secondary lever 272. A secondary clock spring 278 includes an inner angled end 280 which seats in the notched end 274 of pin 266 of the cam hook 264 and an opposite outer angled end 282 which abuts an outwardly angled projection 284 associated with the lever 272 and in order to introduce bias the cam hook 264 in response to rotation of the lever 272 in a counter clockwise direction.

Figure 3D:
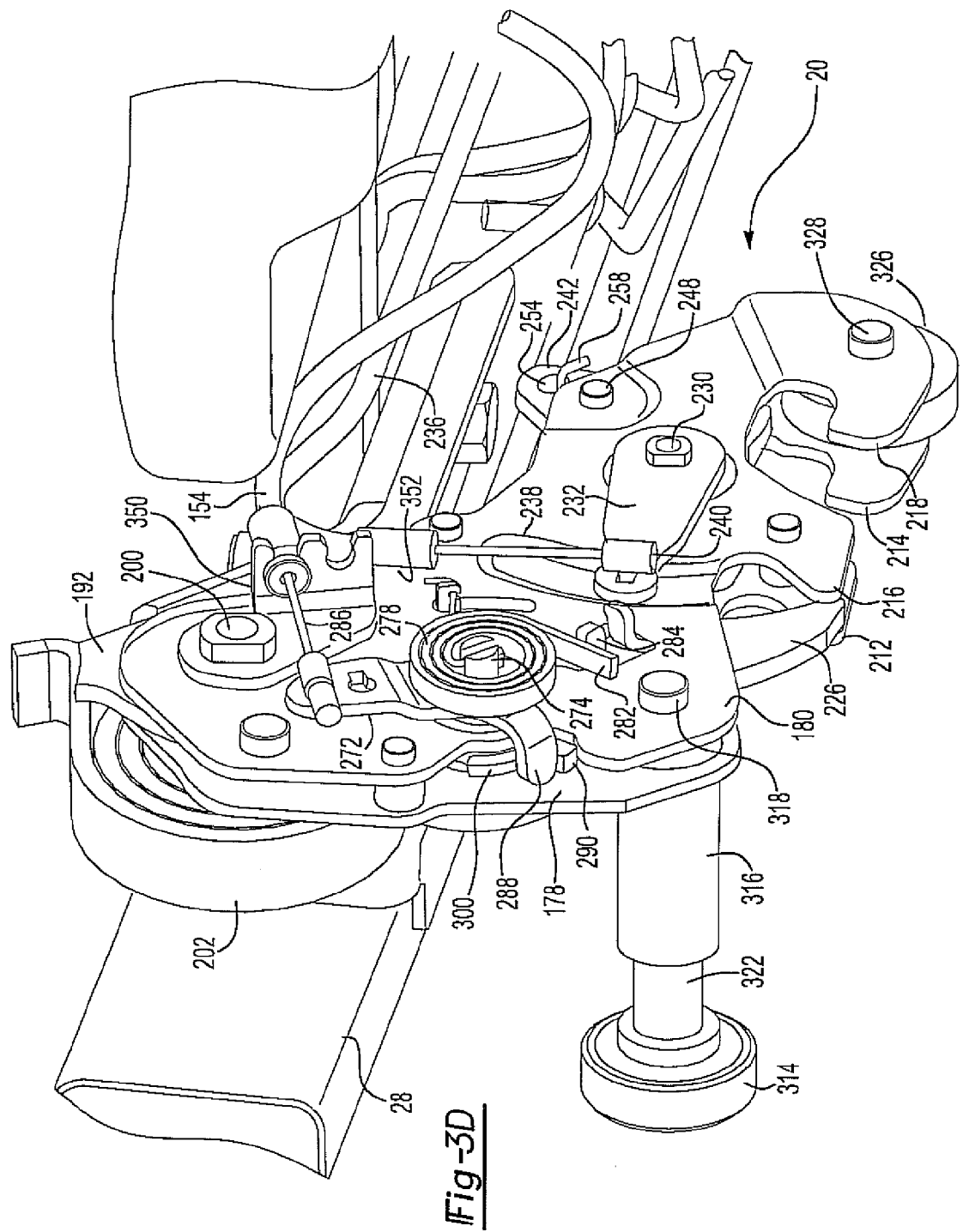
FIG. 3D is an enlarged and underside rotated perspective of the cable arrangement associated with the forward outboard floor latch subassembly as also illustrated in FIG. 1.

As again shown in FIG. 3D, a fixed outer cable sheath represents cable 154 previously described and includes an opposite and translatable inner coil 286 which secures at an end to an upper end location of the secondary lever 272. As will be described subsequently, imparted clockwise rotation of the lever 272, via actuation of the inner translating coil 286, results in an inwardly angled edge 288 of the lever 282 engaging a projecting edge 290 of the cam hook 264 and which extends beyond the forward associated edges of the support plates 178 and 180.

Figure 5:
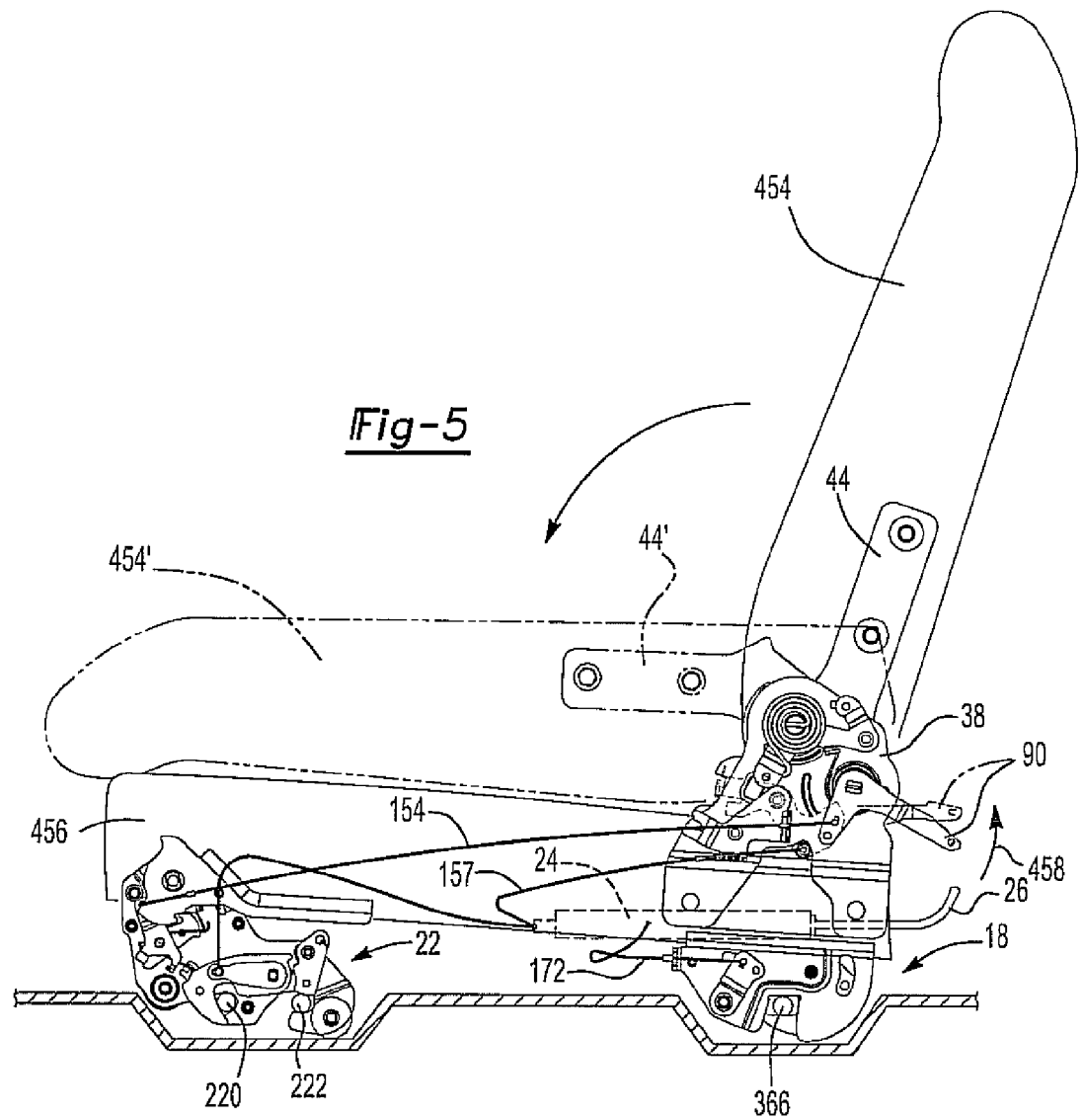
FIG. 5 is a side plan view of a rear row mounted seat assembly, which is a mirror arrangement of that shown in FIG. 1, and which is viewed from an outboard side with the seatback illustrated in both an upright design and a forward (phantom) rotated dump position.

The cam hook 264 further includes an opposite extending and inner hook end 292 (again as best shown in FIG. 3C) and which, in a normally engaged position as shown in the design plan view of FIG. 5 and the pre-tumble illustration of FIG. 7, this hook end 292 engages an inner catch 294 associated a bottom inward facing edge of the turned portion 192 of the pivoting seat frame support arm.

A hook lockout portion 296 (again FIG. 3C) is rotatably secured in seating fashion relative to the hook 264 via an aperture 298 through which an end of the cam hook pin 266 extending opposite the notched end 274 projects. A first exterior and angled portion 300 of the lockout 296 is configured to abut the projecting edge 290 of the cam hook 264 when the hook 264 is actuated in a clockwise direction. A likewise angular extending portion 302 (disposed on an opposite end of the elongated lockout portion 296) is arranged such that it seats through a slotted wall 304 established in the second support plate 180 and to therefore define a limited rotational travel of the lockout portion 296.

Another coil spring 306 is provided (see in exploded fashion relative to exterior facing surface of support plate 180 in FIG. 3C) and includes a first curled end 308 engaging the very end projecting portion 302 of the hook lockout 296. A second end 310 of the coil spring 306 engages a fixed catch portion 312 integrally formed with the support plate 180, thereby biasing the lockout 296 in a counterclockwise fashion.

Additional structural components of note include a pair of first and second wheel supports. A first forward support includes a wheel 314 rotatably secured to an axle 316 which includes an opposite end 318 mounted to an aperture 320 in the support plate 180. A reduced diameter portion 322 in the first wheel axle seats through a mating aperture 324 and so that the wheel 314 projects from an outboard side of the support plate 178 as shown in FIG. 3A. A second wheel 326 includes opposite facing hubs (see at 328) and which seats within aligning apertures 330 and 332 in the support plates 178 and 180, respectively, such that the wheel is supported in a generally lower disposed and rear location of the front latch subassembly 20.

Yet additional features include another secondary clock spring, see at 334, disposed on an exterior facing side of the outboard support plate 178 and which includes an inner angled end 336 which seats within a notched recess of said cam hook pin 266 (and extending opposite the notched recessed end 274 within which the secondary spring 278 seats). An outer curled end 338 abuts an angled portion 340 associated with an exterior face of the support plate 178 and to provide additional counterclockwise bias to the cam hook 264.

An additional plurality of spacer rivets are provided for each of the front latch subassemblies 20 and 22 and for securing the plates 178 and 180 together in a desired spatially aligning fashion and without obstructing the inner working components previously described. To assist in ease of illustration, and referencing the secondary latch subassembly 22 in FIG. 3B, the fixed spacer rivets are more easily referenced and include those shown at 342 and 344 associated with forward end locations of identical configured plates 178 and 180. Additional rivets 346 and 348 are located at intermediate locations of the assembled support plates (see again as referenced by example in FIG. 3B). Cable support brackets are also provided for supporting associated fixed ends of the outer sheath associated with each of the cables 236 and 154, these including a bracket 350 for securing the fixed outer covering for cable 154 (see again FIGS. 3C and 3D), as well as at 352 (see FIG. 3D) for cable 236.

Figure 4A:
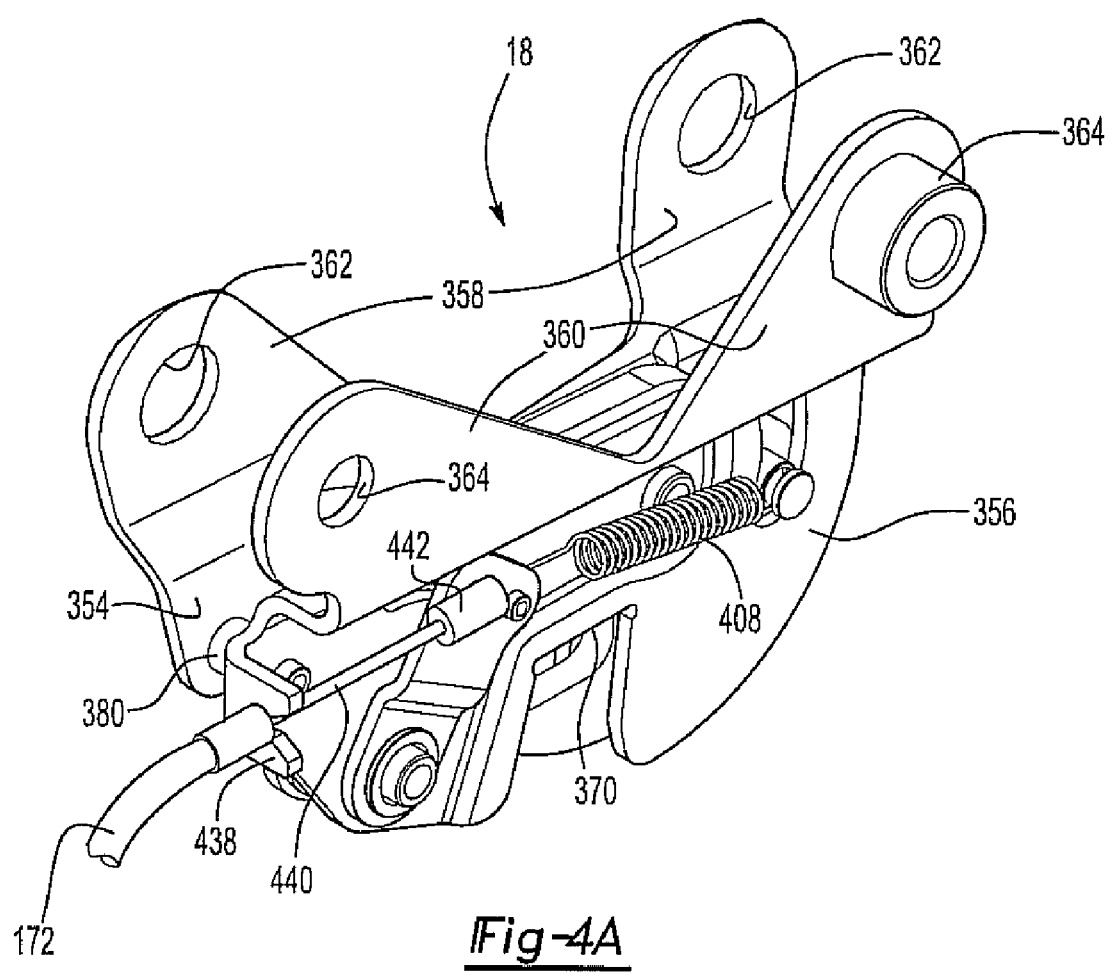
FIG. 4A is a sectional perspective view of an inboard located rear floor latch subassembly also shown in FIG. 1.
Figure 4B:
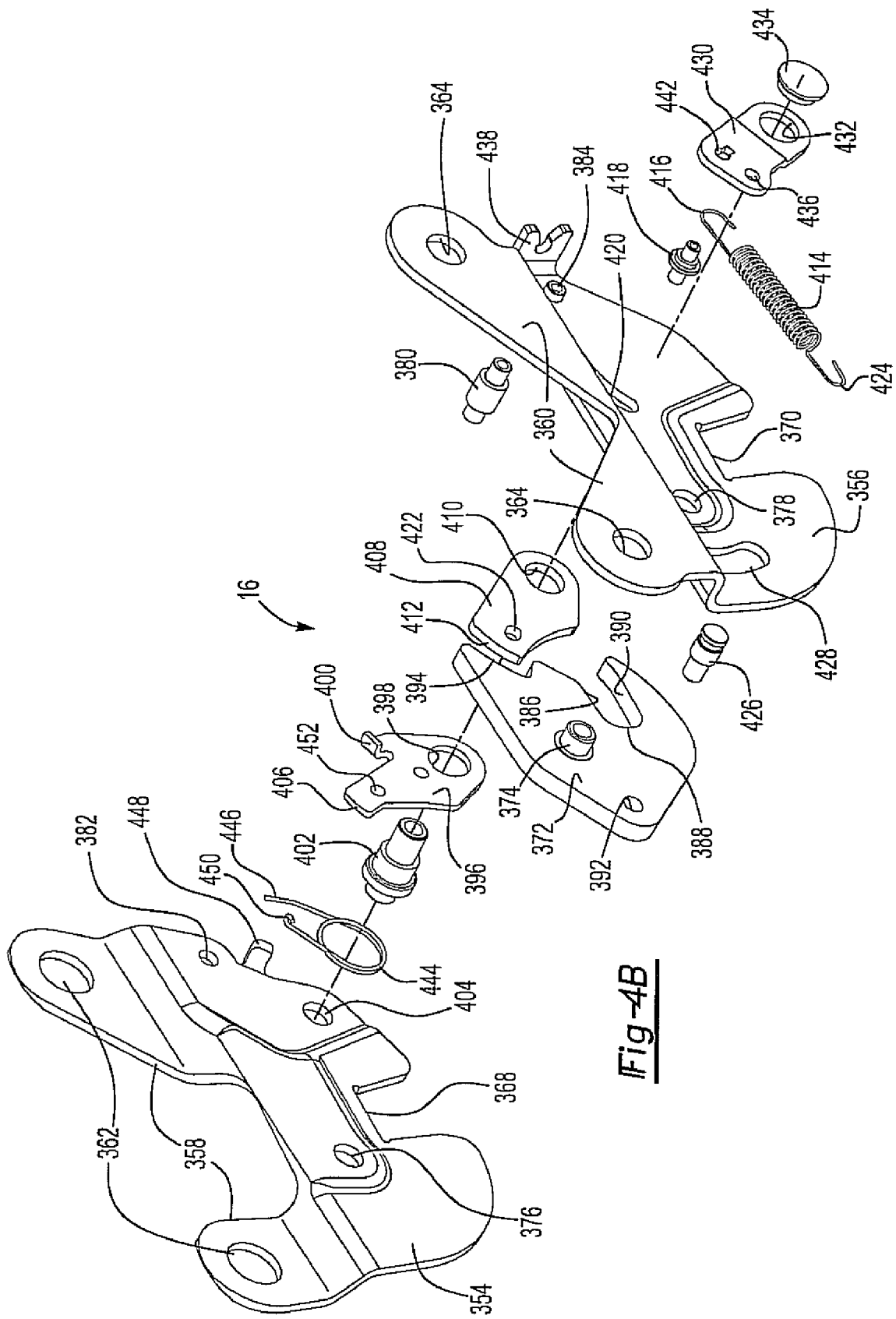
FIG. 4B is an exploded view of the rear floor latch subassembly shown in FIG. 4A.

Referring now to FIGS. 4A and 4B, respective sectional perspective and exploded (as well as rotated) views are illustrated of the inboard located rear floor latch subassemblies 18 and 16, respectively. For purposes of ease of illustration, the rotated and exploded perspective of the latch assembly identified at 16 in FIG. 1 will be described in more detail and includes a first (inner) support plate 354 and a spaced apart second (outer) support plate 356.

The support plates 354 and 356 each exhibit a typically planar support face between which are secured the various additional components of the latch mechanism, and each further includes an upper extending, angled and integrally formed mounting brackets (see at 358 for plate 354 and at 360 for plate 356, respectively). Pairs of mounting holes 362 and 364, respectively, are further defined in the upper mounting brackets 354 and 356, respectively, and in order to receive mounting fasteners, see at 362 and 364 as also shown in FIG. 1, in order to secure the rear latch subassembly 18 to a rear inboard location of the frame support 30 associated with the seat assembly 10 in FIG. 1.

As with previous figure descriptions, it is understood that each of the rear floor latch subassemblies 16 and 18 are substantially identical in construction, with the assembly 16 in environmental illustration of FIG. 1 being mounted in slightly inboard fashion to the rear seat frame cross member 34 (and as opposed to the outboard side frame member 28), this in part to accommodate the seatback latch subassembly 12 and associated cables.

As with the structural components previously recited throughout the several descriptions of the seat frame, seat back latch subassemblies and front floor latch subassemblies, the support plates 354 and 356, in addition to the remaining components of the latch subassembly 18, are constructed of a durable steel grade material and which provide the necessary properties of strength and durability. As shown in the design plan view of FIG. 5, a rear located and floor mounted striker bar is generally referenced at 366 and cooperates with the rearward latch subassembly 18 through the provision of apertured lower arcuate and receiving edges 368 and 370, corresponding to the outer sandwiching plates 354 and 356, and in order to secure the rearward location of the seat assembly to the floor of the vehicle interior.

A latch plate 372 is rotatably secured between the inner support plate 354 and spaced apart outer support plate 356. The latch plate 372 includes a generally centralized aperture through which is secured a mounting pin 374, this positioned in alignment with additional apertures 376 and 378 corresponding with each of the support plates 354 and 356 and in order to secure the latch plate 372 in pivoting fashion between the support plates. A further spacer rivet 380 is illustrated and which aligns and secures within additional aligning apertures 382 and 384 corresponding with plates 358 and 360, and in order to further maintain the plates in a secured and spatially arrayed fashion.

The latch plate 372 includes an arcuate extending inner configuration, see as illustrated by extending and interconnected surfaces 386, 388, and 390 in FIG. 4B, and which collectively define an extended recess within the latch plate 372 which, in cooperation with the apertured receiving edges 368 and 370 in the lower defined surfaces of the outer sandwiching plates 354 and 356, receive the associated striker bar 366 in an engaged position. Additional features of the latch plate 372 include an aperture 392, located towards an end of the latch plate body and spaced from its pivot point (pin 374), as well as a recessed support surface 394 located proximate the striker receiving arcuate configuration.

A first cam 396 is provided and includes a lower/central aperture 398. The cam 396 includes a generally planar shaped body with an upper angled tab 400 and is mounted pivoting fashion between the support plates and proximate in location to the lower arcuate receiving edges 368 and 370 of the inner 354 and outer 356 plates. A mounting pin 402 passing through the aperture 398 in the first cam 396 and, upon seating within aperture 404 in support plate 354 and a further aligning aperture 405 in support plate 356, rotatably affixes the cam 396 between the support plates in positioned fashion relative to the support surface 394 defined within the latch plate 372. The first cam 396, also referenced as an anti-chuck cam, includes a shoulder 406 which seats, or abuts, against the support surface 394 associated with the latch plate 372 in the engaged position.

A secondary cam 408 is fixedly and rotatably secured about the pivot pin 402, via aperture 410, between the inner 354 and outer 356 support plates in coaxial fashion relative to the anti-chuck cam 396. Additional features of the secondary cam 408 include a secondary shoulder 412, positioned proximate the primary support shoulder 406 of the anti-chuck cam 396 and the latch plate support surface 394.

A coil spring 414 includes a first end 416 which secures to a pin 418, in turn extending through a slotted aperture (see at 420 in FIG. 4BA) defined in the outer support plate 356, a projecting end of the pin 418 securing within an aperture 422 associated with an upper end of the secondary cam 408. An opposite extending second end 424 of the spring 414 secures to a pin 426, in turn inserting through a further arcuate slot 428 formed in an opposite end surface of the outer plate 356 and secured to aperture 392 defined in the latch plate 372.

An engagement lever associated with the rear latch subassembly (as referenced at 18 in the illustration of FIG. 4B) is shown at 430 and is disposed on an exterior face of the second support plate 356. An aperture 432 in the lever 430 aligns with the aperture 405 in the support plate 356 and receives a projecting end of the pin 402. A cap 434 secures over an exterior facing side of an inwardly facing circular wall defining the aperture 432, and in order to secure the assembly in place.

A projecting portion of the spring secured pin 418 further seats into an aperture 436 defined in the lever 430 and such that rotation of the lever (in the counterclockwise direction in the instance of the assembly 18 in FIG. 4A or clockwise as in the instance of the exploded view of assembly 16 in FIG. 4B), along first defined slot 420 influences the coil spring 414 to in turn impart a biasing force to the latch plate 372 via pin 426 and further slot 428. As shown in the illustration of the selected rear seatback subassembly 18 in FIG. 4A, the previously described cable 172, this extending from the seatback latch subassembly 12, is secured at its opposite extending end to a bracket 438 (also identically identified in the rotated illustration of the subassembly 16 in FIG. 4B).

An extending end of the translatable inner wire coil, illustrated in FIG. 4A at 440 and opposite to the inner translating end 170 as described in FIG. 2D, secures to a location 442 of the lever 430 (see also again FIG. 4B), concurrent with engagement of the extending coil spring end 424, and to thereby slave actuation of the lever 430 (in a counter clockwise manner as shown in FIG. 4A) to the pulling motion of the cable 172 (with inner translating portion 440).

Referencing again FIG. 4B, a secondary and ring-shaped spring is shown at 444 and seats concentrically about the main pin 402. A first extending end 446 of the spring 444 abuts an inwardly angled finger projection 448 associated with the support plate 354, whereas a second extending end 450 engages an aperture 452 located at a generally upper end location of the first (anti-chuck) cam 396, and in order to bias the first cam in a similar direction (counterclockwise in FIG. 4B) and separate from a similar direction bias exerted on the second cam 408 via the spring 414.

Having provided an extensive description of the structural features associated with the seatback, front floor and rear floor latch subassemblies, explanation will now be made of the seatback dump, tumble and seat removal protocols, referring both to the various plan view illustrations set forth throughout FIGS. 5, 6 and 7, in cooperation with the flow diagram protocol of FIG. 8. In the course of the following explanation, cross reference will be made to the dump/tumble/rearward removal protocols with the various structural views outlined in FIGS. 5-7.

Referring again to FIG. 5, a side plan view is shown of a rear row mounted seat assembly, which again is a mirror arrangement of that shown in FIG. 1 and which is viewed from an outboard side with the seatback illustrated in both an upright design and a forward (phantom) rotated dump position. A seatback 454 (including exterior cushioning) is illustrated in both design and forward dumped (at 454') positions relative to a seat bottom 456 (also including a cushioning body and within which is incorporated the seat bottom frame as described in FIG. 1). The seatback release lever 90 is further shown in FIG. 5 as being rotatably actuated, in a direction referenced by arrow 458, and as will be described, in a counterclockwise direction a minimum 12.88°, to a maximum of 25°, and in order to release the seatback 454 (via arm 44) to the forward rotated dump position 454'.

Figure 5A:
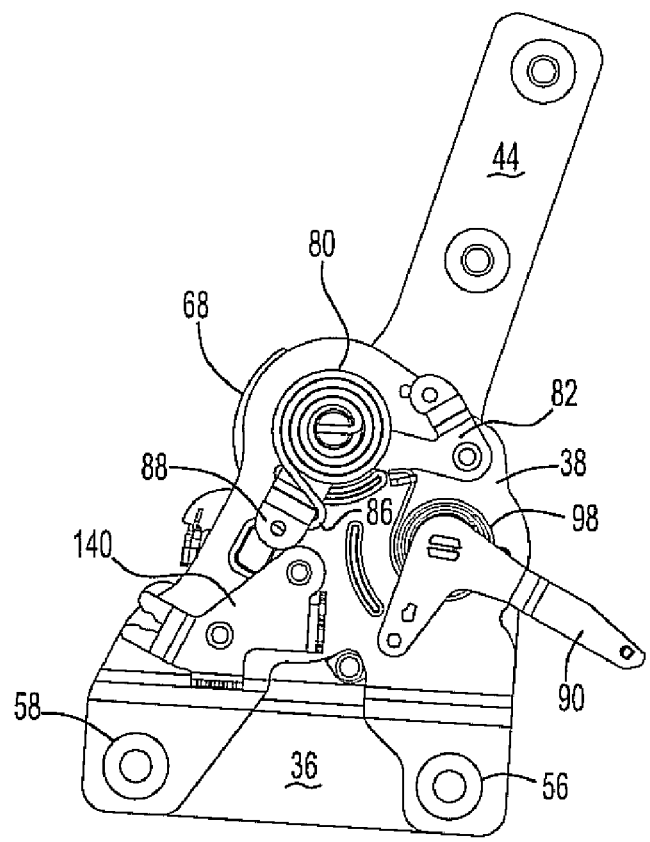
FIG. 5A is plan view of the outboard seatback latch, as also substantially shown in FIG. 2B, and with the setback arm in its upright design position.
Figure 5B:
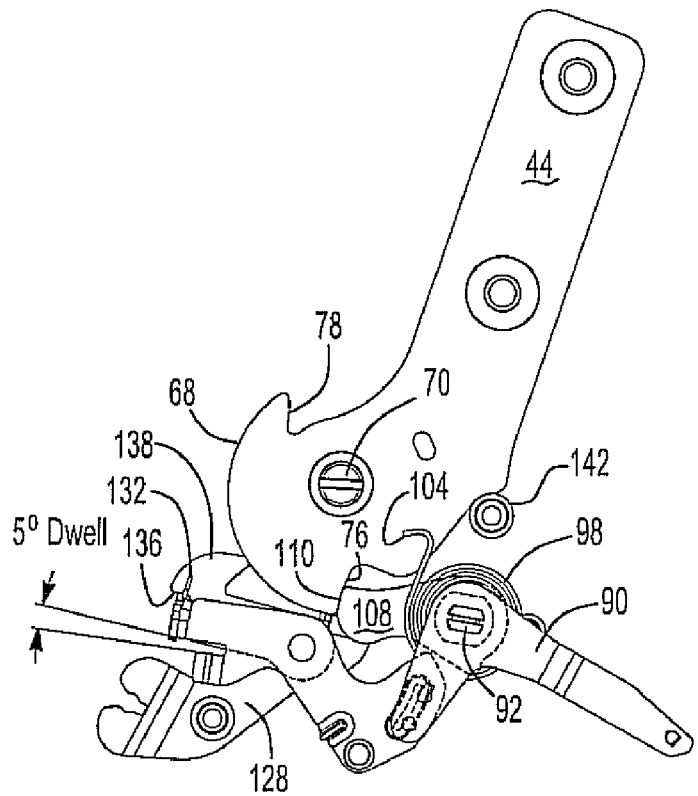
FIG. 5B is a partial plan view of components associated with the outboard seatback latch and illustrating a 5° dwell zone between inboard and outboard located latch release levers, these being loaded in respective clockwise and counterclockwise directions and for the purpose of absorbing variations therebetween and further to avoid a crash condition between the levers.

Referring to FIG. 5A, a plan view is shown of the outboard seatback latch, as also substantially shown in FIG. 2B, and with the setback arm in its upright design position (see also step 470 in dump protocol according to FIG. 8). Referencing further FIG. 5B, a partial plan view is shown of components associated with the outboard seatback latch subassembly 12. In particular, the illustration of FIG. 5B references a 5° dwell zone established between respective inboard 14 and outboard 12 located latch release levers, these being loaded in respective clockwise and counterclockwise directions for the purpose of absorbing variations therebetween and further to avoid a crash condition between the levers. Otherwise, the position of the design position of the seatback release lever 90 influences the rotatably offset and slaved seatback cam 108 in abutting engagement with the seatback shoulder location 76 in its likewise upright design position.

Figure 5C:
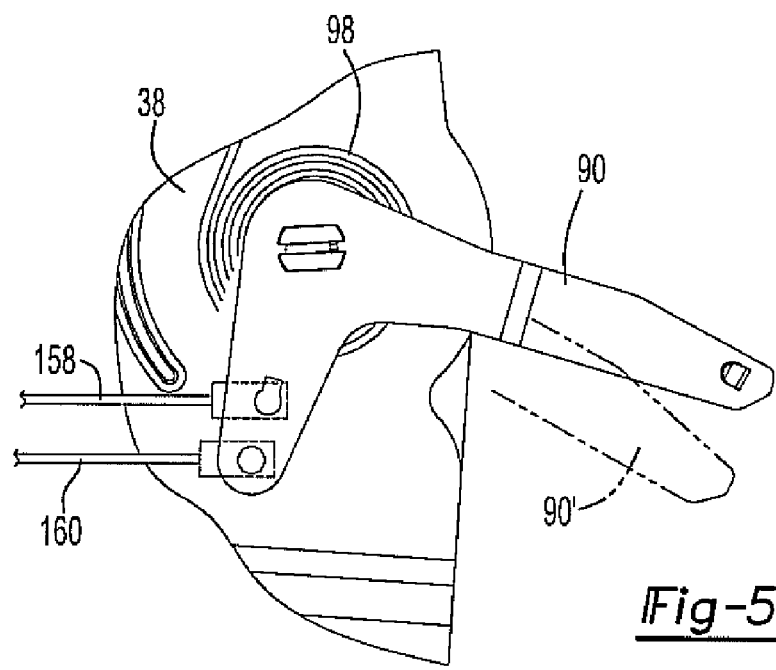
FIG. 5C is a partial plan view illustration of the seatback handle rotatable to a minimal arm release position.

Progressing to FIG. 5C, a partial plan view illustration is shown of the seatback handle rotatable to a minimal arm release position, e.g. again determined to be at least 12.88° and as shown between lower phantom 90' and upper solid 90 rotated positions. Reference is also made to step 472 in the dump protocol of FIG. 8.

Figure 5D:
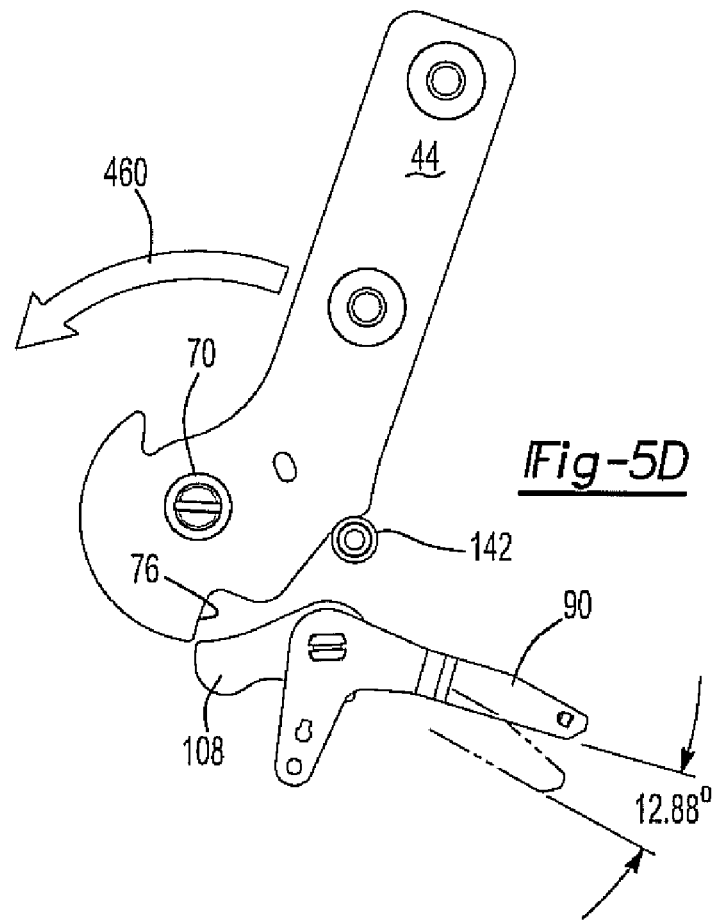
FIG. 5D is an illustration representing the seatback handle as shown in FIG. 5C and further illustrating a release condition of the seat back for forward dump rotation.

FIG. 5D is an illustration representing the seatback handle 90 as shown in FIG. 5C and further illustrating a release condition of the seat back arm 44 for forward dump rotation. This again occurs upon the upward rotation motion of the seatback release lever 90 causing the slaved cam 108 to displace from abutting engagement with the abutment shoulder location 76 associated with the seatback arm 44, thus permitting the arm 44 to rotate forward out of abutting contact with stud 142 and forwardly in the direction referenced by arrow 460.

Figure 5E:
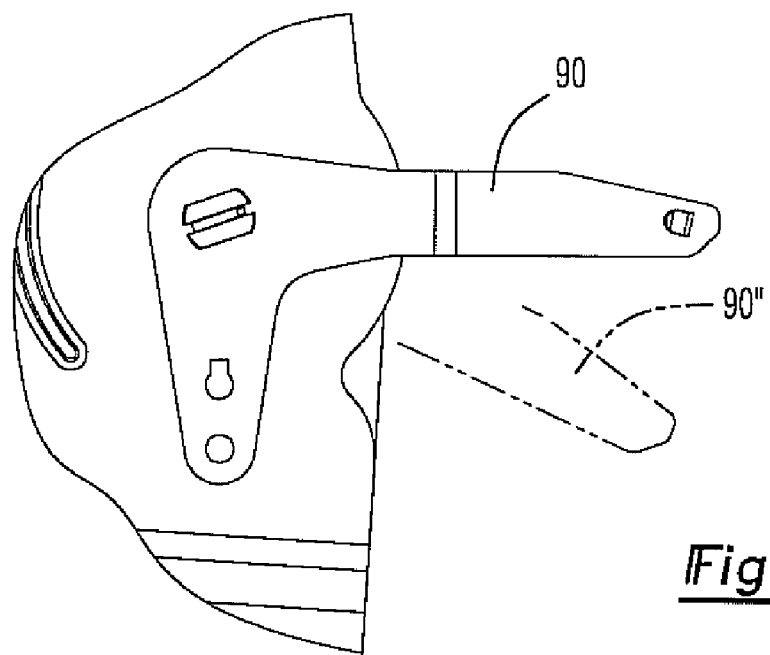
FIG. 5E is an illustration similar that shown in FIG. 5C and of the seatback handle further rotated to a maximum seatback release orientation.
Figure 5F:
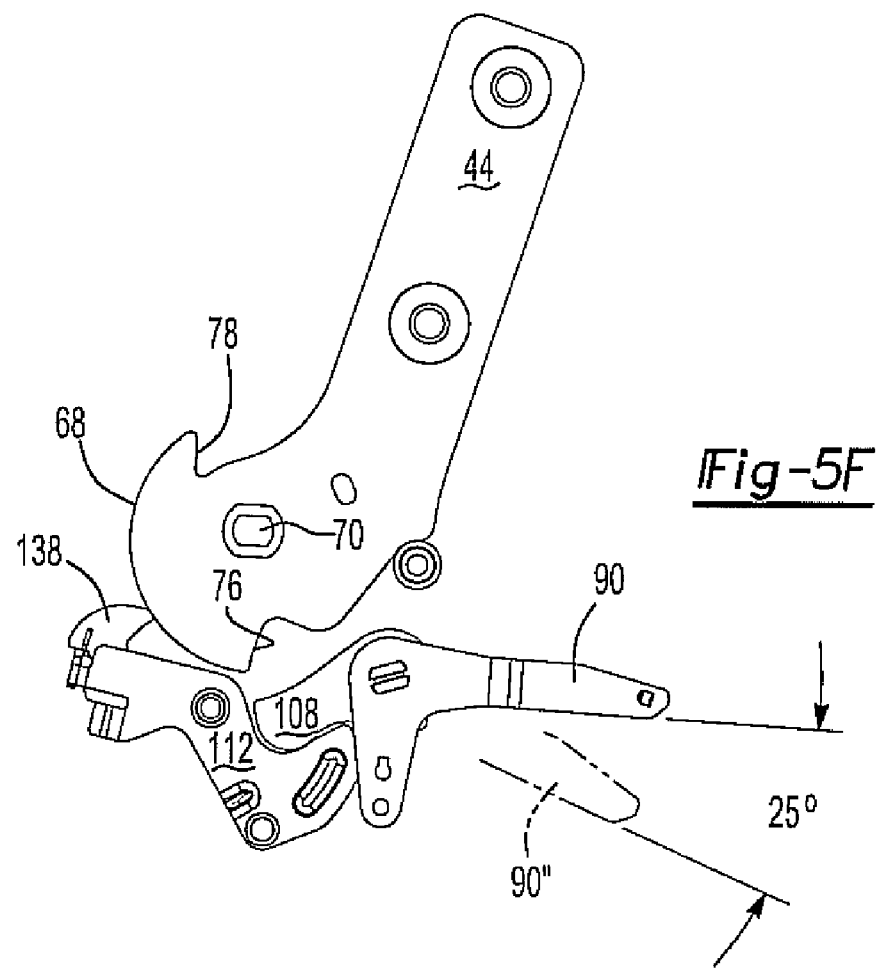
FIG. 5F is an illustration representing the seatback handle as shown in FIG. 5E and further illustrating the maximum angular displacement of the handle in the seat dump protocol, this causing engagement of the rotatably slaved seatback cam with the outboard rear floor latch release lever, in turn causing a hook portion associated with a second inboard release lever slaved to abut a location of the lower rounded profile of the arm.

Figures FIG. 5E and 5F are illustrations similar that shown in FIG. 5C and of the seatback handle further rotated to an optional and maximum seatback release orientation, from initial position 90" in phantom to maximum (25°) upwardly displaced position shown at 90. Reference is further made to step 474 in FIG. 8. By explanation, and upon the seatback 454 (e.g. via integrated arm 44) being retained (such as by being manually held) in its upright design position, the handle 90 may be rotated to its maximum 25°, at which point it abuts against the primary component 112 associated with the seatback release lever. This in turn causes the secondary hook engaging component 114 to engage (via an outer contoured surface associated with its hook 138) against the rounded underside profile 68 of the seatback arm 44, thus preventing the arm from rotating forwardly.

Figure 6:
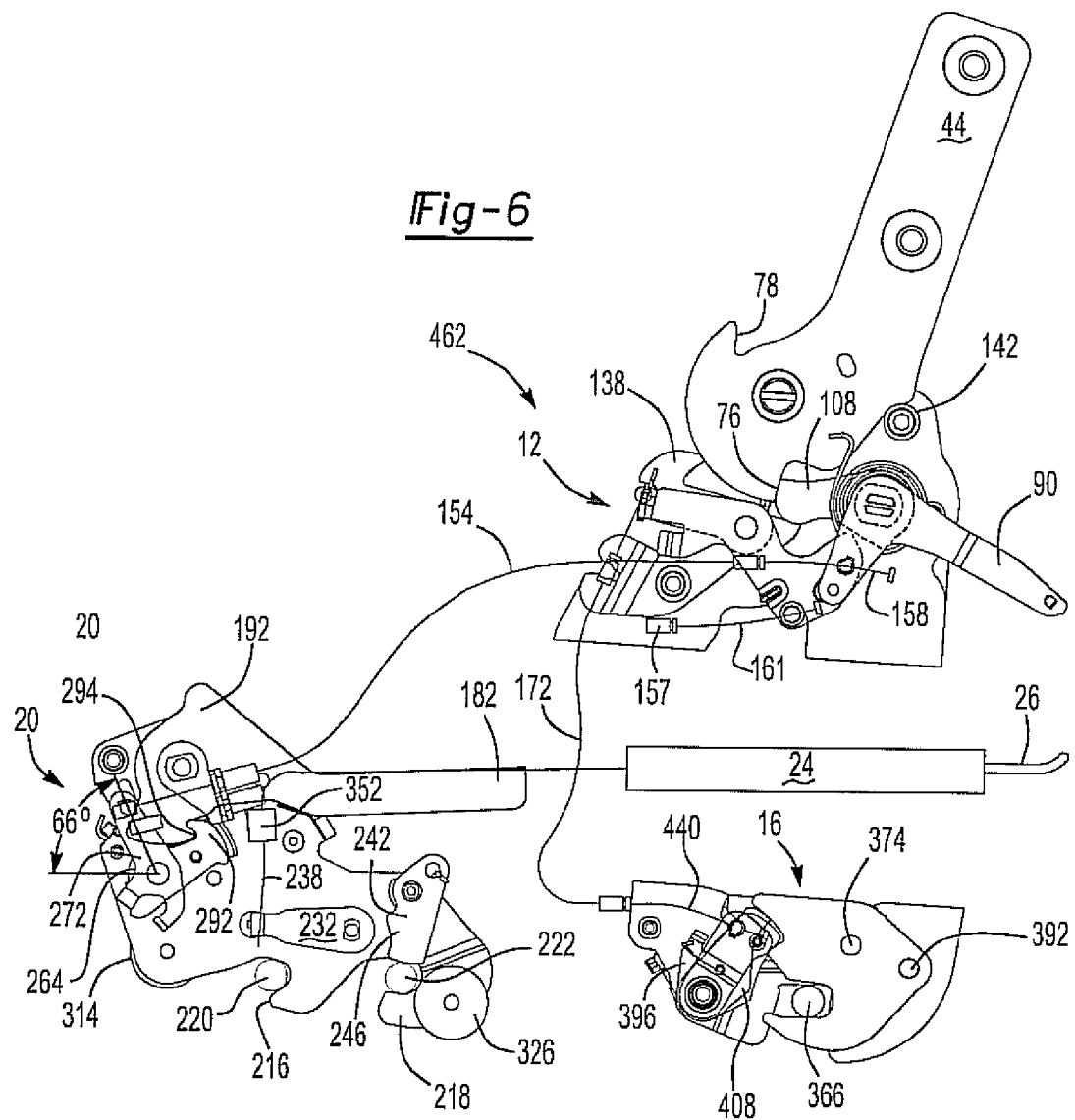
FIG. 6 is plan schematic view, with certain components removed, of the seat assembly in an upright design and pre-tumble condition.
Figure 7:
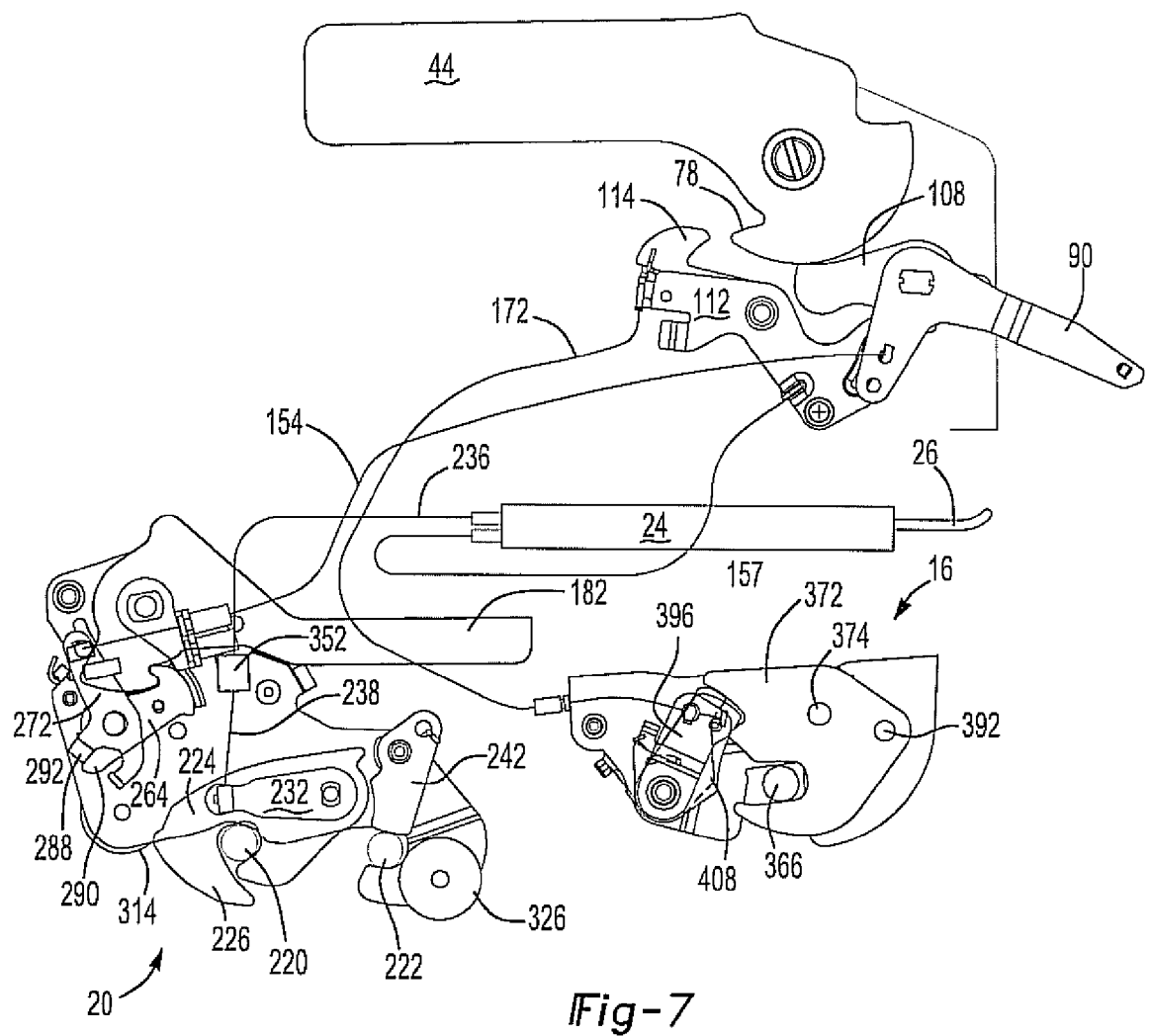
FIG. 7 is a plan schematic view of a seat assembly in a post-seatback dump condition and prior to engagement of the seat removal module.

Progressing now to FIG. 6 an overall plan schematic view is illustrated at 462, with certain components removed, of the seat assembly in an upright design and pre-tumble condition. Of note, the exterior support plates associated with each of the seatback, front floor and rear floor sub-latch assemblies are removed for purposes of clarify of illustration. Otherwise, FIG. 6 references each of the seatback 12, floor front 20 and floor rear 16 subassemblies in their substantial design upright position also shown in FIG. 5.

Figure 6A:
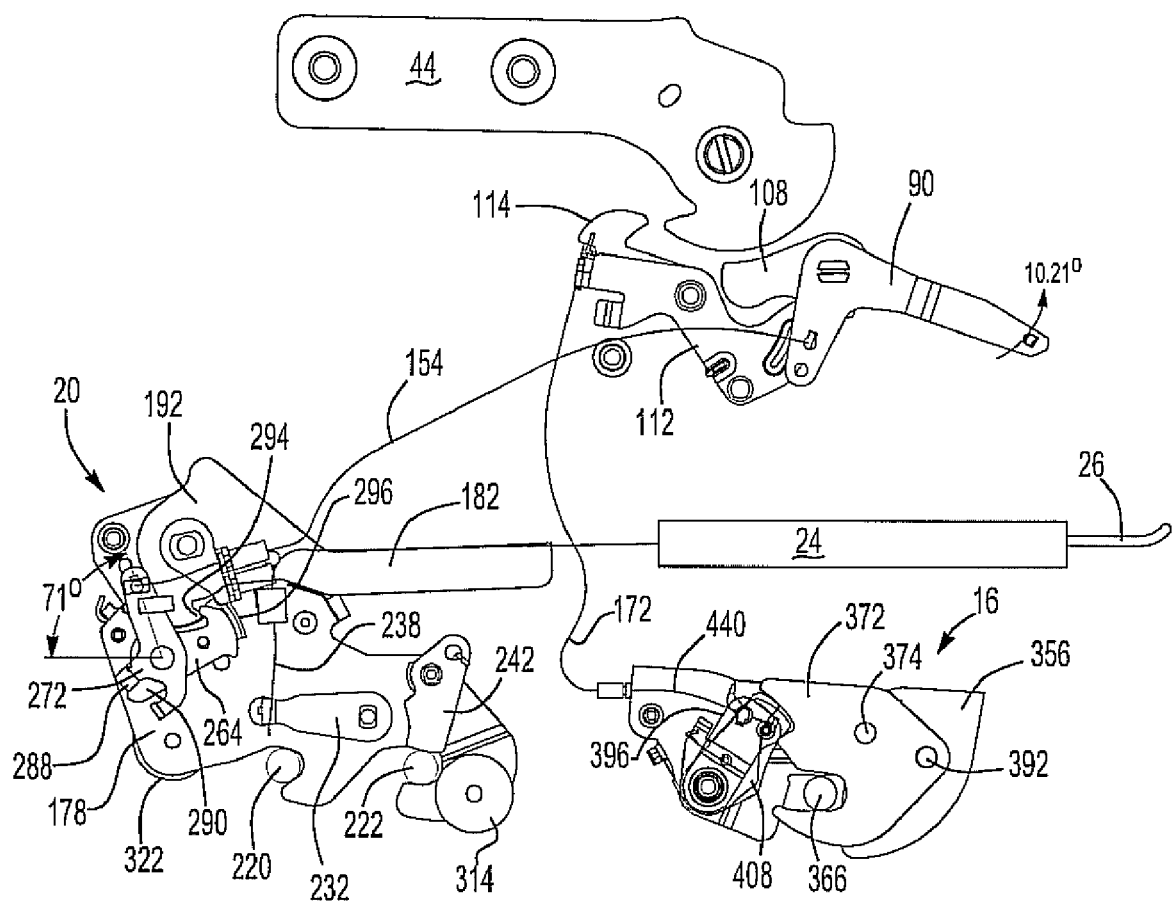
FIG. 6A is a succeeding illustration to that shown in FIG. 6, following seatback dump according to the previously described protocol, and in which an initial rotation of the handle causes disengagement of the front floor latch subassemblies, through disengaging motion of the cam hook associated with the outboard front floor latch subassembly and in order to release a rotatable forward frame support arm associated with each forward latch subassembly.

Progressing to the succeeding illustration of FIG. 6A, the seatback 44 is dumped according to the protocol previously described in reference to FIGS. 5-5D and as schematically described in the initial dump protocol sequence of FIG. 8, again via actuation of the seatback handle 90. The degree of forward rotation of the seatback arm 44 (as referenced by positions 454 and 454' in FIG. 5) is approximately 100°, at which point the slaved rotating seatback lever 152 actuates translating inner wire 176 of cable 174 the cable box (or seat removal module 24) lock out cable. The maximum rotation of the seatback arm 44 is stopped at approximately 108°, at which point the seatback and associated cushion foam (see again at 454' in FIG. 5) contacts the associated cushioned seat bottom 456.

Although not shown in FIG. 6A, a clockwise spring load applied to the hook component 114 (again FIG. 2C) of the seatback lever causes the same to rotate a minor incremental degree (e.g. typically 2.65°) until a minor clearance (or slack) is removed between the cable end fittings and attachment (see again cable 172 with inner translating wire portion 170). At this point, the cable is stopping the lever component 114 from rotating.

Following seatback dump according to the previously described protocol, additional rotation of the seatback handle 90 (of 10.21° as shown) causes the seatback cam to engage the release lever to clockwise, thereby initiating disengagement, initially, of the front floor latch subassemblies via actuation of the cam hook 114 associated with each forward floor latch subassembly, and in order to release a rotatable forward frame support arm associated with each forward latch subassembly. In particular, and referencing first the front floor latch 20, the pulling motion exerted by the cable 154 in particular via the inner translatable coil 286 which secures to the upper end location of the secondary lever 272 causes the lever to increase its longitudinal angle relative to a horizontal from 66° as shown in FIG. 6 to 71° in FIG. 6A. This in turn causes the inwardly angled edge 288 of the lever 282 to engage the projecting bottom edge 290 of the cam hook 264, and which again extends beyond the forward associated edges of the support plates 178 and 180. The cam hook 264 at this point begins its unseating motion in a clockwise direction relative to the seat frame release arm 182 (see again contacting location 294). Reference is also made to initial seat tumble protocol step 476 in FIG. 8.

Figure 6B:
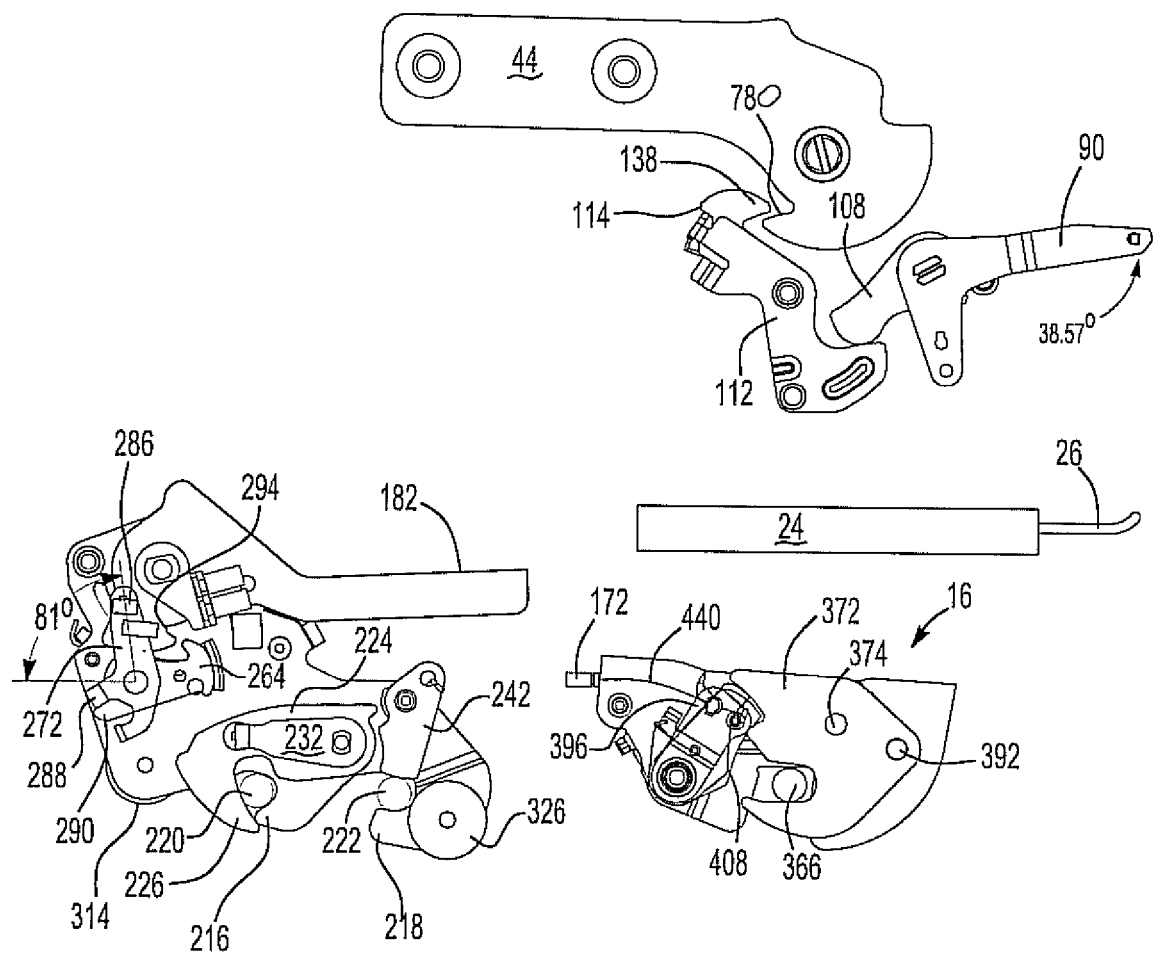
FIG. 6B is a further succeeding illustration by which an additional rotation of the handle results in the forwardly dumped arm being locked in place by the seatback release lever, concurrent with the forward cam hook rotating to a degree necessary to permit seat tumble.

As successively shown in FIG. 6B, an additional rotation of the handle 90 (to 38.57°) results in the forwardly dumped arm 44 being locked in place by the seatback release lever, this occurring by extending hook 138 of secondary release component 114 seating against shoulder location 78 of seat back arm 44 in its dumped condition. In concurrent fashion, additional rotational actuation of the secondary lever 272 (again via the pulling motion of the inner translatable coil 286 secured in extending fashion between the seatback handle 90 and seat floor front lever 272) against the cam hook 264 (see lever increasing its angle of pivoting to 81° in FIG. 6B from 71° in FIG. 6A, causes the hook 264 to now rotate to a degree necessary (out of alignment with seating location 294 associated with rotatably secured seat frame 182) to permit seat tumble to occur (also step 478 in FIG. 8).

Although not readily evident from the illustration of the rear floor latch subassembly 16 in FIG. 6B, the actuation of the inner translating coil 442 on the release lever 430 (see also FIGS. 4A and 4B) is to a degree where additional translation (as will be seen in FIG. 6C) causes the secondary 408 and primary 396 (anti-chuck) cams to rotate out of engagement with the latch plate 372 (and in particular its shoulder support surface 394. This is shown in FIG. 6C and concurrent with a maximum seat back handle 90 rotation of 50.00°; whereby the forward latch release lever 272 is caused to pivot to a maximum 94° relative to the horizontal (with the cam hook 264 abutting against a top surface of striker latch 226) and in which the rear floor latch cams 396 and 408 are rotated out of engagement with the associated latch plate support surface 394 and the tumble motion of the seat permitted to initiate. See also step 480 in tumble protocol of FIG. 8.

Figure 6D:
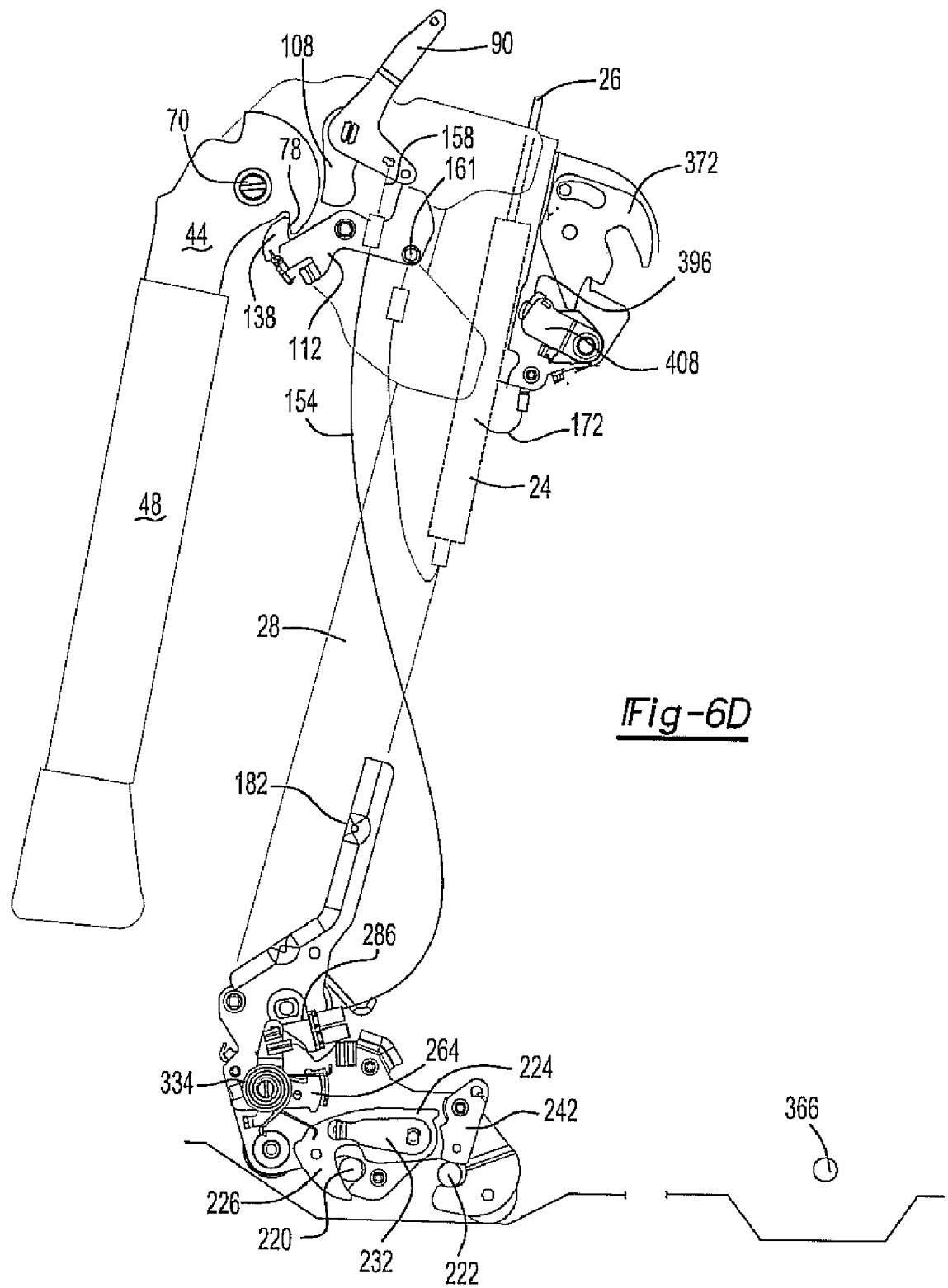
FIG. 6D is a fully tumbled illustration of the seat assembly.

FIG. 6D is a fully tumbled illustration of the seat assembly and by which the seat frame arm 182 is released and permitted to tumble (about axis 194 and relative to floor support plates 178 and 180) in a forward fashion. At this point, the spring loaded action applied by the rear floor latches (this exerted by the ccw bias of the front floor mounted main clock springs 202 exerted upon the rotatable seat arm 182) causes the latch plates associated with each rear floor latch subassembly, see as again shown at 372 for subassembly 16 in FIG. 4B, to open (via the absence of the anti-chuck 396 and secondary 408 cams). Also, and although not clearly evident, the view of FIG. 6D is presented as a plan cutaway of FIG. 1 and by which the interengaging components of the seatback latch 129 selected front floor latch 20 and latch 16 are shown.

Figure 7A:
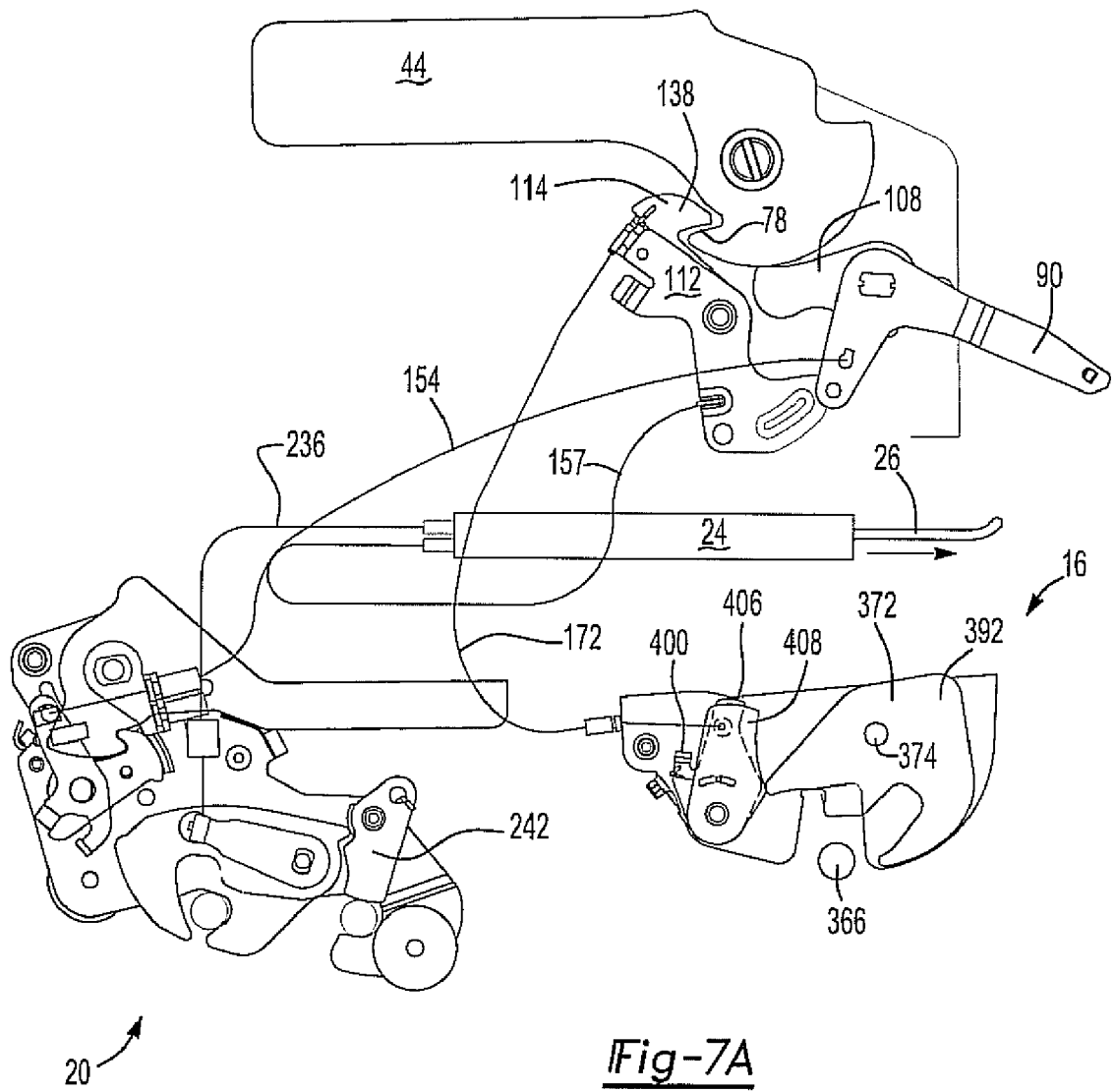
FIG. 7A is a succeeding view to that shown in FIG. 7 and by which a ½ pull of the rear module release handle causes simultaneous retraction of the rear floor latch subassembly cam, thereby releasing the rear latch plate, and concurrently partially retracting the forward-most striker engaging hook associated with the front latch subassembly.
Figure 7B:
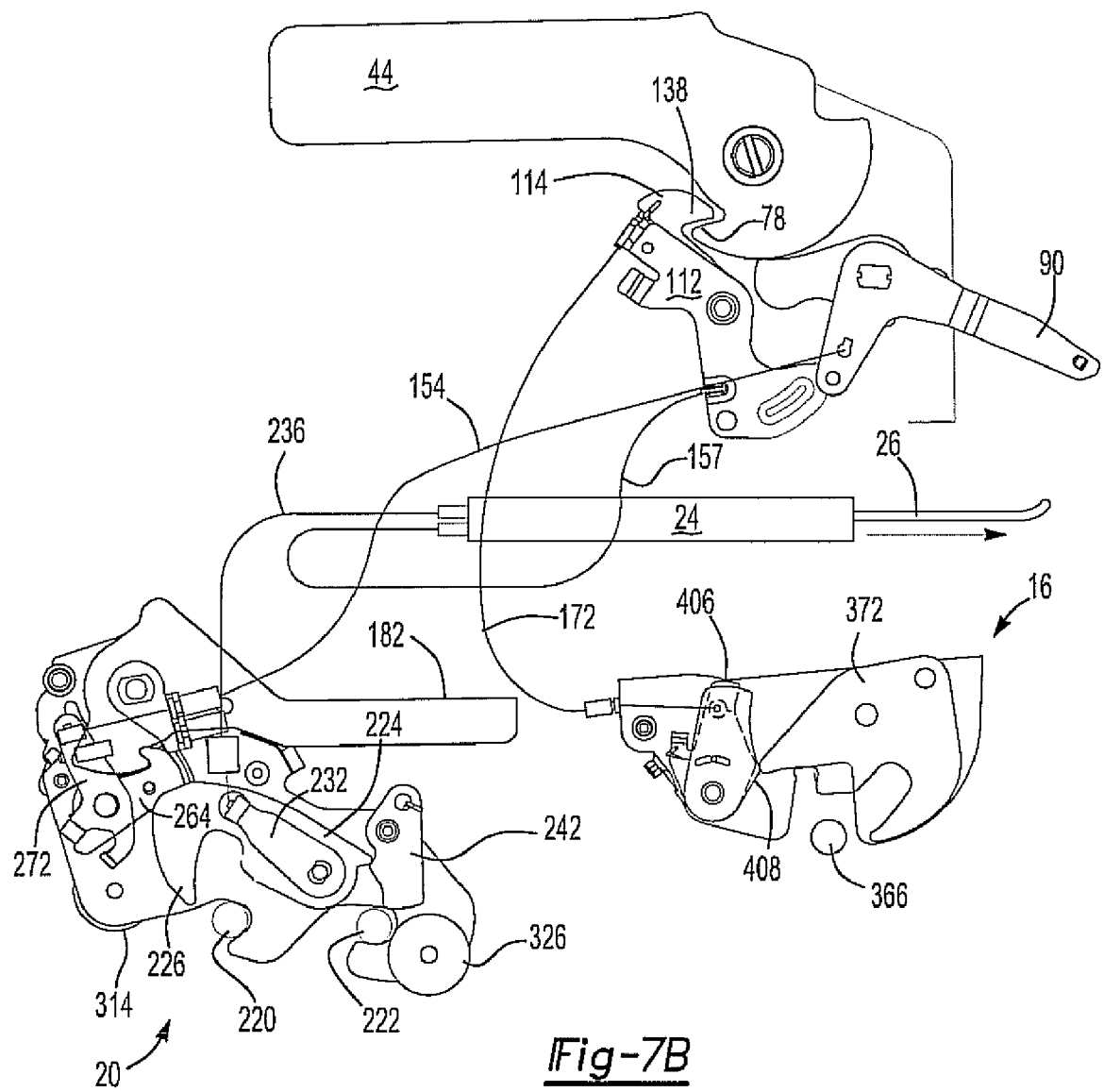
FIG. 7B is a further succeeding illustration of the seat removal protocol and by which full rearward displacement of the release handle results in complete retraction of the forward-most striker engaging hook and rear cam of the front subassembly and relative to the rearward-most forward floor strikers, thereby allowing rearward removal of the seat.

With reference finally to FIGS. 7, 7A and 7B, in cooperation with again referencing the environmental view of FIG. 1, an explanation will now be made of the seat removal protocol. As previously described, seat removal occurs upon initial seatback dump as described in FIGS. 5-5D, and such that the seatback 44 is referenced as shown in FIG. 7 To reiterate, seat removal follows seatback dump and is an alternate protocol to a seat tumble as has been described in reference to FIGS. 6-6D.

With reference first to FIG. 7, a plan view is shown of the seat assembly in a post-seatback dump condition and prior to engagement of the seat removal module 24. In this condition, the front and rear floor latch subassemblies are secured to their respective floor mounted strikers.

FIG. 7A is a succeeding view to that shown in FIG. 7 and by which a ½ pull of the rear module release handle 26 (see also step 482 in removal protocol of FIG. 8) causes simultaneous retraction of the rear floor latch subassembly cams (first anti-chuck cam 396 and secondary cam 408), thereby releasing the rear latch plate 372, and concurrently partially retracting the forward-most striker engaging hook 226 associated with the front latch subassembly. As illustrated, the plurality of cables associated with the seat removal module 24 and include, as shown in FIG. 1, cable 236 extending to lever 272 (as well as corresponding cable 272' extending to secondary forward seat latch subassembly 22) and which are associated with front floor latch release subassembly, a cable 174 extending to rotatable and slaved cable actuating portion 152, and cable 157 extending to the seatback latch subassembly 12 and securing to a location of the seatback lever release component 112. As illustrated in both of FIGS. 1 and 7-7C, cable 172 again extends from seatback release lever 114 to rear latch lever 430 and cable 154 extends from seatback lever 90 to secondary engagement lever 272.

The initial displacing motion of the handle 26 causes the cables 236 and 236' to displace the engagement lever 232 and, thereby, their rotatably slaved forward floor hook 224 (in a clockwise direction and relative to the front floor strikers (see as shown at 220 in FIG. 7A). Concurrently, the seatback release 114 is pivoted in the clockwise direction, by virtue of the translation motion exerted along cable 157 and which causes the slaved component 112 to rotate in the clockwise direction, thereby causing slaved secondary component 114 to likewise rotate clockwise to thereby cause the rear latch subassembly 18 to be disengaged via cable 172 while, concurrently, cable 168 proceeds to likewise disengage rear latch subassembly 16. At this point, the hook configured portion 138 associated with slaved seatback release 114 will displace into engagement with the shoulder location 78 of the seatback arm 44 associated with the dump position.

FIG. 7B is a further succeeding illustration of the seat removal protocol and by which full rearward displacement of the release handle 26 (see finally step 484 in FIG. 8 seat removal protocol) results in complete retraction of the forward-most striker engaging hook 224 and forward most portion 226 relative to the forward striker 220 (again via cables 236 and 236'). Rotation of the rear projection location 246 of the hook 224, out of engagement with the recessed mating location 244 of the rear (anti-chucking) cam 242, simultaneously causes the same to freely rotate (by virtue of the spring 256 bias) out of engagement with the striker 222 thereby allowing rearward removal of the seat.

In use, the seat assembly 10 can be re-secured to the rear row vehicle interior upon repositioning the front and rear floor assemblies relative to the forward strikers 220 and 222 and rearward striker 366. At this point, the rear latch assemblies will re-engage striker 366. Subsequent actuation of the handle 90 will cause the front floor latches to (e.g. floor latch plates 224 and anti-chuck rear cam 242) to re-engage the strikers 220 and 222. The seatback can then be rotated upwardly to the design position of FIG. 5 to complete the re-installation protocol.

Accordingly, the present invention teaches a novel and improved seat assembly for facilitating selective seat dump, tumble and rearward displacing removal from within a vehicle. It is also envisioned that a powered version of the seat assembly could be provided, utilizing substantially the structure disclosed herein, and in substitution of the manual dump and removal protocol discussed.

Having described our invention, other and additional preferred embodiments will become apparent to those skilled in the art to which it pertains, and without deviating from the scope of the appended claims.

We claim:

1. A rear row and convertible vehicle seat releasably secured to front and rear floor mounted strikers, said seat comprising:
    a frame incorporating a seat bottom and a pivotally associated seat back;
    a seatback latch subassembly mounted to a pivotally associated location between said seat bottom and seat back and including a release handle for selectively rotating said seat back to a dump position against said seat frame;
    a front floor latch subassembly mounted to a forward location of said seat frame and operatively engaging the front striker;
    a rear floor latch subassembly mounted to a rearward location of said seat frame and operatively engaging the rear striker;
    a first plurality of cables extending from said setback latch subassembly in communication with said front and rear floor latch subassemblies such that said seatback latch subassembly, via said release handle, operatively engages said front and rear floor latch subassemblies according to a first operating protocol to forward tumble said seat bottom and dumped seat back about the front striker;
    a seat removal module secured to a rear accessible location of said seat frame and including a displaceable handle; and
    a second plurality of cables extending from said seat removal module in communication with at least one of said seatback, front and rear floor latch subassemblies such that, upon actuation of said displaceable handle, said front and rear floor latch subassemblies release from the strikers according to a second operating protocol to permit said seat to be removed from the vehicle in a rearward withdrawing direction.

2. The seat as described in claim 1, seat exhibiting a specified shape and size and further comprising pairs of outboard and inboard located seatback latch subassemblies, front floor latch subassemblies and rear floor latch subassemblies mounted to respective outboard and inboard side locations of said seat frame.

3. The seat as described in claim 2, seat outboard located seatback latch subassembly further comprising:
    a seatback arm exhibiting an arcuate lower profile and which is rotatably slaved between a pair of support plates fixed to said frame, said arcuate profile including first and second circumferentially spaced shoulder locations associated with upright and dump positions of said arm;

a cam disposed in sandwiching fashion between said support plates and rotatably slaved to said release lever, said cam exhibiting an outer arcuate edge which engages said first shoulder location of said seatback arm in the upright position, initial rotation of said release lever causing said cam to displace from said first shoulder location concurrent with forward seat dump; and a seatback latch release lever pivotally secured between said support plates and including a projecting hook portion, additional rotation of said release handle, according to said first operational protocol, causing said slaved cam to contact and pivotally actuate said release lever, thereby initiating forward tumble of said seat.

4. The seat as described in claim 3, further comprising a first clock spring biasing said release handle and slaved cam in a first rotational direction, a second clock spring biasing said seatback arm in a second opposite rotational direction.

5. The seat as described in claim 3, said seatback release lever further comprising a first component and a second partially overlapping component incorporating said projecting hook portion, a pin extending through aligning apertures defined through said first and second components and seating within an aperture associated with an outer selected support plate, a central wound portion of a biasing coil spring seating over a projecting end portion of said pin and in order to bias said second component in a direction towards said seatback arm.

6. The seat as described in claim 1, said first plurality of cables further comprising a first cable extending from a first location of said seatback release handle to an outboard located forward seatback latch subassembly, a second cable extending from a further location associated with said seatback release handle to a seatback arm slaved and rotatable portion associated with an inboard located seatback latch subassembly.

7. The seat as described in claim 5, said second plurality of cables further comprising a first cable extending from said seat removal module to a location associated with said first seatback release lever component.

8. The seat as described in claim 6, said first plurality of cables further comprising a third cable extending from a further location of said first seatback release lever to said outboard located rear floor latch subassembly.

9. The seat as described in claim 8, said first plurality of cables further comprising a fourth cable extending from said second seatback release lever component to said inboard located rear floor latch subassembly.

10. The seat as described in claim 7, said second plurality of cables further comprising a second cable extending from said seat removal module to a rotatably slaved cable actuating portion associated with said outboard located seatback arm.

11. The seat as described in claim 10, said second plurality of cables further comprising third and fourth cables extending from said seat removal module to said outboard and inboard located front floor latch subassemblies.

12. The seat as described in claim 1, said forward floor latch subassembly farther comprising:

a pair of spaced apart support plates, each of said plates including at least one lower most and forward directed projection and such that, upon assembly of said plates, aligning pairs of projection define receiving locations for the forward located floor mounted strikers; and a forward extending support arm defining a first seat frame mounting bracket and a second turned portion arranged in sandwiching fashion between said support plates;

a main pivot pin inserting through said turned portion to rotatably secure said forward support arm rotatably relative to said support plates, a main clock spring including angled ends secured to said main pivot pin and said support arm to bias said support arm in a tumble direction relative to said support plates; and a cam hook lockout assembly rotatably disposed between said support plates and actuated between a design portion abutting said support arm and a rotated release position for allowing tumbling/pivoting motion of said arm relative to the floor secured strikers.

13. The seat as described in claim 12, said cam hook lockout assembly further comprising a cam hook in operative engagement with forward extending support arm in a pretumble condition, a cable actuated engagement lever secured to an outer face of a selected support bracket and to which said cam hook is rotatably slaved, a clock spring biasing said cam hook in a direction towards said seat support arm.

14. The seat as described in claim 13, said cam hook lockout assembly further comprising a hook lockout portion rotatably secured in seating fashion relative to said cam hook, a first exterior and angled portion of said lockout portion being configured to abut a projecting edge of said cam hook when said hook is actuated in a clockwise direction, a further angular extending portion disposed on an opposite end of said lockout portion arranged such that it seats through a slotted wall established in a selected and inboard located support plate to define a limited rotational travel of said lockout portion.

15. The seat as described in claim 14, further comprising a coil spring including a first curled end engaging said further angular extending portion of said lockout portion, a second end of said coil spring engaging a fixed catch portion integrally formed with said inboard support plate, thereby biasing said lockout in a counterclockwise fashion.

16. The seat as described in claim 12, said forward floor latch subassembly farther comprising a floor hook rotatably secured between said support plates and defining a lower hook portion which opposes and is disposed between a forward most pair of said spaced apart forward directed projections to capture a forward most located striker therebetween.

17. The seat as described in claim 16, further comprising an anti-chucking cam arranged between said support plates in contacting fashion with a rear-side configured edge of said floor hook and in operative engagement with a rearward most located striker.

18. The seat as described in claim 16, further comprising a second cable actuated engagement lever arranged on an exterior face of an inboard mounted front floor support plate, said floor hook being slaved rotatably to said further lever.

19. The seat as described in claim 17, further comprising a mating ridge and valley configuration is established between opposing edges of said anti-chucking cam and said floor hook, a further coil spring biasing said anti-chuck cam in a counterclockwise direction.

20. The seat as described in claim 12, further comprising first and second wheel supports secured to generally forward and rearward lower disposed locations between said support plates associated with said front floor latch subassembly.

21. The seat as described in claim 13, further comprising another secondary clock spring disposed on an exterior facing side of an outboard support and which provide additional counterclockwise bias to said cam hook.

22. The seat as described in claim 1, said rearward floor latch subassembly further comprising:

a pair of spaced apart and downwardly extending support plates secured to locations associated with said seat frame and each defining lower arcuate and receiving edges for receiving therebetween the rear mounted floor striker;

a latch plate rotatably secured between said rear mounted support plates and exhibiting an arcuate extending inner configuration which, in cooperation with said lower apertured receiving edges associated with said plates, capture said rear striker in an engaged position; and at least one cam rotatably slaved to an exterior mounted and cable actuated lever for selectively engaging said latch plate in either of a striker mounted or release configurations.

23. The seat as described in claim 22, further comprising a first anti-chuck cam exhibiting a generally planar shaped body with an upper angled tab and which is mounted in pivoting fashion between said support plates and proximate in location to said lower arcuate receiving edges of said inner and outer plates, said first cam exhibiting a shoulder abutting a support surface associated with said latch plate in the engaged position.

24. The seat as described in claim 23, further comprising a secondary cam fixedly and rotatably secured in common and overlapping fashion relative to said first anti-chuck cam, said secondary cam exhibiting a secondary shoulder positioned proximate said primary support shoulder of said anti-chuck cam and said latch plate support surface.

25. The seat as described in claim 24, further comprising a coil spring including a first end secured to a pin in turn extending through a slotted aperture defined in a selected outer support plate, a projecting end of said pin securing to an upper end of said secondary cam, an opposite extending second end of said spring securing to a pin in turn inserting through a further arcuate slot formed in an opposite end surface of said selected support plate and securing to a further location to said latch plate.

26. The seat as described in claim 25, further comprising a secondary and ring-shaped spring seating concentrically about a pivot associated with said first and second cams in order to bias said first cam in a similar direction and separate from a similar direction bias exerted on said second cam via said coil spring.

27. A rear row and convertible vehicle seat releasably secured to front and rear floor mounted strikers, said seat comprising:

a frame incorporating a seat bottom and a pivotally associated seat back;

a pair of outboard and inboard seatback latch subassemblies mounted to pivotally associated locations between said seat bottom and seat back, said outboard mounted latch subassembly including a release handle and which is also operatively communicated with said inboard mounted latch assembly for selectively rotating said seat back to a dump position against said seat frame;

a pair of outboard and inboard front floor latch subassemblies mounted to forward locations of said seat frame and operatively engaging at least one pair of front strikers;

a pair of outboard and inboard rear floor latch subassemblies mounted to rearward locations of said seat frame and operatively engaging a pair of rear strikers;

a seat removal module secured to a rear accessible location of said seat frame and including a displaceable handle; and a plurality of cables extending between locations associated with said seatback, front and rear floor latch subassemblies and said seat removal module and such that said seatback latch subassembly, via said release handle, operatively engages said front and rear floor latch subassemblies according to a first operating protocol to forward tumble said seat bottom and dumped seat back about the front striker;

upon actuation of said displaceable handle associated with said seat removal module, said floor latch subassemblies release from front and rear strikers according to a second operating protocol to permit said seat to be removed from the vehicle in a rearward withdrawing direction.

* * * * *